(12) United States Patent
Sugimoto

(10) Patent No.: US 8,061,694 B2
(45) Date of Patent: Nov. 22, 2011

(54) VIBRATION ISOLATION DEVICE

(75) Inventor: Yukihiro Sugimoto, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 427 days.

(21) Appl. No.: 12/303,473

(22) PCT Filed: Jun. 5, 2007

(86) PCT No.: PCT/JP2007/061331
§ 371 (c)(1),
(2), (4) Date: Dec. 4, 2008

(87) PCT Pub. No.: WO2007/142215
PCT Pub. Date: Dec. 13, 2007

(65) Prior Publication Data
US 2009/0174127 A1    Jul. 9, 2009

(30) Foreign Application Priority Data

| Jun. 5, 2006 | (JP) | 2006-156283 |
| Aug. 25, 2006 | (JP) | 2006-228621 |
| Mar. 15, 2007 | (JP) | 2007-066235 |

(51) Int. Cl.
*F16F 15/04* (2006.01)
(52) U.S. Cl. .................................. 267/140.13
(58) Field of Classification Search ............. 267/140.12, 267/140.13; 248/550, 562, 634, 636, 638
See application file for complete search history.

(56) References Cited

U.S. PATENT DOCUMENTS

| 5,060,917 A * | 10/1991 | DuBos et al. ............. 267/140.13 |
| 5,295,671 A | 3/1994 | Nakagaki et al. |
| 6,371,257 B1 * | 4/2002 | Connolly ..................... 188/72.4 |
| 6,557,836 B2 * | 5/2003 | Itoh ........................... 267/140.11 |
| 6,863,269 B2 * | 3/2005 | Okumura et al. ......... 267/140.13 |
| 7,549,519 B2 * | 6/2009 | Atwater et al. ............... 188/381 |
| 7,552,916 B1 * | 6/2009 | Williams et al. ......... 267/140.13 |
| 7,584,944 B2 * | 9/2009 | Goudie ..................... 267/140.12 |
| 2002/0101014 A1 * | 8/2002 | Kurihara et al. ......... 267/140.13 |

FOREIGN PATENT DOCUMENTS

| JP | 05-126187 A | 5/1993 |
| JP | 05-296285 A | 11/1993 |
| JP | 08-291835 A | 11/1996 |
| JP | 10-030675 A | 2/1998 |
| JP | 10-169713 A | 6/1998 |
| JP | 2001-193103 A | 7/2001 |
| JP | 2004-263785 A | 9/2004 |
| JP | 2005-321085 A | 11/2005 |

* cited by examiner

*Primary Examiner* — Christopher Schwartz
(74) *Attorney, Agent, or Firm* — Sughrue Mion, PLLC

(57) ABSTRACT

In a vibration isolation device 10, a connection rod 12 penetrates through a cavity part 104 of a rubber elastic body 44 and the inner circumferential side of a main body plate 14. In addition, a stopper rubber 98 fixed on the outer circumferential side of a rod main body 13 of the connection rod 12 is placed in the cavity part 104 of the rubber elastic body 44. This allows the rod main body 13 aligned in overlying relation with the rubber elastic body 44 along the axial direction of the connection rod 12 to be stored in the device. Thus, a stopper member 96 fixed to the rod main body 13 of the connection rod 12 can form a stopper mechanism. Therefore, while suppressing the increase in dimension along the axial direction of the device, the dimension along the axial direction of the device can be prevented from expanding by the stopper mechanism for preventing the excessive displacement along the direction orthogonal to the axis of the connection rod 12.

20 Claims, 13 Drawing Sheets

VIBRATION ISOLATION DEVICE

TECHNICAL FIELD

The present invention relates to a vibration isolation device to be applied to, for example, cars and general industrial machines, for attenuating and absorbing vibration transferred from the vibration generation part such as an engine to the vibration receptive part such as a car body.

BACKGROUND ART

Conventionally, in vehicles such as cars, in order to suppress the transmission of vibration from the power unit including an engine and a gear box which are the main vibration generating sources to the car body, and thereby to implement excellent ride comfort, and to protect various members attached to the car body from vibration, the power unit is supported by the car body via an engine mount as a vibration isolation device. As the mounting system of the power unit using such a vibration isolation device, there is a pendant system such as a pendulum system. As the vibration isolation devices for use in such a pendant system, those described in JP-A Nos. 10-30675 and 2004-263785 are known.

The vibration isolation device described in JP-A No. 10-30675 includes a thick-walled cylindrical elastomer body (elastic body) disposed between a lower support plate and an upper support plate, and a connection rod (connection member) penetrating through the central parts of the lower support plate and the elastic body, and connected and fixed at the upper end thereof to the upper support plate.

Whereas, the vibration isolation device described in JP-A No. 2004-263785 includes a shaft part (connection member) connected to a rubber main body (elastic body) inside a cylindrical mount main body at the upper end, and protruding from the mount main body on the lower end side, a connection arm connected and fixed to the lower end of the connection member, and a rubber stopper covering the outside of the connection arm. With the vibration isolation device, upon input of a load along the backward and forward direction or the sideway direction of the vehicle, the connection arm comes in contact with the leg part of the vibration isolation device via the rubber stopper. As a result, excessive displacement in the backward and forward direction or in the sideway direction of the vehicle of the connection member is inhibited.

DISCLOSURE OF THE INVENTION

Problems that the Invention is to Solve

Incidentally, the vibration isolation device disclosed in JP-A No. 10-30675 is configured as follows. A cylindrical axial duct is integrally formed at the central part of the lower support plate. An elastic body is filled leaving no space between the connection member inserted into the inner circumferential side of the axial duct and the axial duct. This restricts the excessive displacement in the backward and forward direction or sideway direction of the connection member. However, when such a structure is adopted, the vibration transmission rate along the backward and forward direction or the sideway direction is also high, so that it becomes impossible to effectively absorb the vibration along the backward and forward direction or the sideway direction.

Further, in the vibration isolation device of JP-A No. 2004-263785, as compared with the vibration isolation device of JP-A No. 10-30675, the dimension along the axial direction of the connection member cannot be elongated unless the dimension along the direction of height (axial direction) of the device is expanded. Thus, the amount of fall of the connection member relative to vibration along the backward and forward direction or the sideway direction becomes relatively large. For this reason, a problem of a reduction of the durability of the elastic body tends to occur. Further, in the vibration isolation device of Patent Document 2, the stopper mechanism includes the connection arm disposed below the mount main body along the axial direction, the stopper rubber covering the outside of the connection arm, and the leg part for connecting the mount main body to the car body side. For this reason, the dimension along the axial direction of the device is inevitably expanded in order to dispose the stopper mechanism therein.

In view of the foregoing fact, it is an object of the invention to provide a vibration isolation device which can set the length along the axial direction of the connection member sufficiently long without expanding the device size, and can provide a stopper mechanism therein for limiting the excessive displacement along the backward and forward direction or the sideway direction orthogonal to the axial direction of the connection member.

Means for Solving the Problem

In order to solve the foregoing problem, a vibration isolation device of a first embodiment includes: a first main body member formed in a ring shape, and to be connected to a vibration receptive part; a rod-like connection member penetrating through the inner circumferential side of the first main body member, and to be connected to a vibration generation part at the proximal end side protruding outwardly from the first main body member; a second main body member connected and fixed to the distal end protruding outwardly from the first main body member in the connection member; and a substantially tubular elastic body placed on the outer circumferential side of the connection member and between the first main body member and the second main body member, and elastically connecting the first main body member and the second main body member, wherein a cavity part through which the connection member penetrates is formed at the central part of the elastic body, and a stopper rubber is placed in the cavity part, and the stopper rubber is fixed to the outer circumferential side of the connection member, such that the outer circumferential surface of the stopper rubber faces the inner circumferential surface of the first main body member with a prescribed gap interposed therebetween.

In the vibration isolation device of the first embodiment, the cavity part through which the connection member penetrates is formed at the central part of the elastic body, and the stopper rubber made of an elastic material is placed in the cavity part. In addition, the stopper rubber is fixed to the outer circumferential side of the connection member, and is allowed to face the inner circumferential surface of the first main body member with a prescribed gap interposed therebetween. As a result, when a load along the backward and forward direction or the sideway direction orthogonal to the axial direction of the connection member (which will be hereinafter comprehensively referred to as a "direction orthogonal to axis") is inputted to the device via the connection member, elastic deformation occurs in the elastic body, and the rod-like connection member undergoes displacement along the direction of input of the load while oscillating about the connection part with the second main body member.

At this step, when the input load is small, and the displacement amount along the transverse direction of the connection member is smaller than the gap between the outer circumferential surface of the stopper rubber and the inner circumferential surface of the first main body member, displacement along the transverse direction of the connection member is not restricted by the inner circumferential surface of the first main body member. Thus, the displacement (vibration) along the direction orthogonal to axis of the connection member occurring with load input is gradually attenuated by the elastic deformation of the elastic body.

Further, when the input load is large, and the connection member undergoes displacement along the direction orthogonal to axis in agreement with the gap between the outer circumferential surface of the stopper rubber and the inner circumferential surface of the first main body member, the stopper rubber is pressed against the inner circumferential surface of the first main body member, and undergoes elastic deformation, thereby to restrict the displacement along the direction orthogonal to axis of the connection member.

Further, in the vibration isolation device of the first embodiment, the connection member penetrates through the cavity part formed at the central part of the elastic body and the inner circumferential side of the first main body member. In addition, the stopper rubber fixed on the outer circumferential side of the connection member is placed in the cavity part. This allows the part aligned in overlying relation with the elastic body along the axial direction of the connection member to be stored in the device. Thus, the stopper rubber fixed to the portion stored in the cavity part of the connection member can form the stopper mechanism. Therefore, the dimension along the axial direction of the connection member can be elongated while suppressing the increase in dimension along the axial direction of the device. In addition, the dimension along the axial direction of the device can be prevented from expanding by the stopper mechanism for preventing the excessive displacement along the transverse direction of the connection member.

Further, a vibration isolation device of a second embodiment further comprising an elastic cover part integrally formed with the elastic body, wherein the elastic cover part covers the region facing at least the stopper rubber at the inner circumferential surface of the first main body member.

Further, a vibration isolation device of a third embodiment is characterized in that, in the vibration isolation device of the first embodiment or the second embodiment, a cross sectional shape of at least one of the inner circumferential surface of the first main body member or the outer circumferential surface of the stopper rubber is a non-circular shape.

Still further, a vibration isolation device of a fourth embodiment is characterized in that, in the vibration isolation device according to any one of the first to third embodiments, the elastic body and the stopper rubber are respectively formed of rubber materials having different characteristics with respect to the input vibration.

Furthermore, a vibration isolation device of a fifth embodiment is characterized by including: in the vibration isolation device according to any one of the first to fourth embodiments, a main liquid chamber including the elastic body as at least a part of a division wall, and containing a liquid sealed therein; a sub liquid chamber provided in such a manner as to face the main liquid chamber and as to be along the axial direction of the connection member, and containing a liquid sealed therein; a diaphragm member forming a part of the division wall of the sub liquid chamber, and configured to be deformable in the expansion and contraction direction of expanding and contracting of the internal volume of the sub liquid chamber; a screen member placed between the main liquid chamber and the sub liquid chamber along the axial direction, and forming respective parts of the inner wall surfaces of the main liquid chamber and the sub liquid chamber; and a restriction passage for establishing mutual communication between the main liquid chamber and the sub liquid chamber.

A vibration isolation device of a sixth embodiment is characterized in that, in the vibration isolation device of the fifth embodiment, the elastic body, the main liquid chamber, the sub liquid chamber, and the screen member are respectively formed in a ring shape, and are placed on the outer circumferential side of the connection member so as to surround the connection member, and the sub liquid chamber is provided so as to face the main liquid chamber along the axial direction of the connection member.

In the vibration isolation device of the sixth embodiment, the elastic body, the main liquid chamber, the sub liquid chamber, and the screen member are respectively formed in a ring shape, and are placed on the outer circumferential side of the connection member so as to surround the connection member. As a result, the intermediate part in the axial direction of the connection member can be placed so as to be aligned in overlying relation with the elastic body, the main liquid chamber, the sub liquid chamber, and the screen member along the axial direction. Therefore, it is possible to elongate the dimension along the axial direction of the connection member while suppressing the increase in dimension along the axial direction of the device.

Further, with the vibration isolation device of the sixth embodiment, the sub liquid chamber is provided so as to face the main liquid along the axial direction with the screen member interposed therebetween. Thus, the sub liquid chamber can be placed so as to be aligned in overlying relation with the main liquid chamber along the radial direction. For this reason, as compared with a conventional vibration isolation device in which the sub liquid chamber is placed on the outer circumferential side of the main liquid chamber, the dimension along the radial direction of the device can also be reduced.

Further, a vibration isolation device of a seventh embodiment is characterized in that, in the vibration isolation device according to the first embodiment, the diaphragm member includes a diaphragm main body configured to be deformable in the expansion and contraction direction, and the diaphragm main body is formed as a separate body from the elastic body.

Further, a vibration isolation device of an eighth embodiment is characterized in that, in the vibration isolation device of the seventh embodiment, the elastic body and the diaphragm main body are respectively formed of different types of rubber materials.

Further, a vibration isolation device of a ninth embodiment is characterized in that, in the vibration isolation device of the seventh embodiment or the eighth embodiment, the second main body member includes an inner tube part formed in a substantially cylindrical shape, and through which the distal end side of the connection member is inserted, and an outer tube part formed in a substantially cylindrical shape, and placed on the outer circumferential side of the inner tube part, and the diaphragm member includes an inner circumference support metal part attached to the inner circumferential part of the diaphragm main body throughout the entire circumference thereof, and fitted by insertion and fixed to the outer circumferential side of the inner tube part, and an outer circumference support metal part attached to the outer circumferential part of the diaphragm main body throughout the entire circumference thereof, and fitted by insertion and fixed to the inner circumferential side of the outer tube part.

Further, a vibration isolation device of a tenth embodiment is characterized in that, in the vibration isolation device of the fourth embodiment, the outer tube part includes a swaging part which has undergone plastic deformation toward the inner circumference side thereof after fitting by insertion of the outer circumference support metal part to the inner circumferential side of the swaging part, and restricts movement along the axial direction of the outer circumference support metal part.

Further, a vibration isolation device of an eleventh embodiment is characterized by including: in the vibration isolation device of the ninth embodiment or the tenth embodiment, a fixing nut screwed from the distal end side of the connection member, and for fixing the inner circumference support metal part to the connection member while pressing the inner circumference support metal part; and a relative movement prevention member for preventing relative movement in the circumferential direction of the second main body member and the inner circumference support metal part.

As described above, when the inner circumference support metal part is fixed to the connection member by a fixing nut, the fixing nut is rotated while pressing the inner circumference support metal part. However, the invention includes the relative movement prevention member as described above. Therefore, it is possible to prevent the following: the inner circumference support metal part and the second main body member slide on each other, so that the fixing nut and the inner circumference support metal part rotate together. This can prevent the twisting of the diaphragm main body.

A vibration isolation device of a twelfth embodiment is characterized in that, in the vibration isolation device of the eleventh embodiment, the relative movement prevention member is configured such that at least one of the inner circumferential surface of the inner circumference support metal part or the outer circumferential surface of the inner tube part includes a high friction surface having a higher friction coefficient than that of a smooth surface.

Thus, by forming the contact part of the inner circumference support metal part or the inner tube part by a high friction surface, it is possible to suppress the relative movement in the direction of circumference of the second main body member and the inner circumference support metal part.

Incidentally, the high friction surface herein can be formed by knurling or other processings for forming unevenness.

A vibration isolation device of a thirteenth embodiment is characterized in that, in the vibration isolation device of the eleventh embodiment or the twelfth embodiment, the relative movement prevention member comprises a notch part formed by cutting away the inner circumferential surface of the inner circumference support metal part outwardly in the radial direction, and an engagement convex part protruding outwardly in the radial direction at the outer circumferential surface of the inner tube part and engaged with the notch part.

Thus, by engaging the engagement convex part of the inner tube part in the notch part of the inner circumference support metal part, it is possible to inhibit the relative movement in the direction of circumference of the second main body member and the inner circumference support metal part.

A vibration isolation device of a fourteenth embodiment is characterized in that, in the vibration isolation device of any of the eleventh to thirteenth embodiments, the relative movement prevention member comprises a convex part protruding inwardly from the inner circumferential surface of the inner circumference support metal part, and an engagement swaging part formed by deforming the fixing nut side end of the inner tube part along the convex part.

Thus, by swaging the end of the inner tube part, and engaging it with the convex part of the inner circumference support metal part, it is possible to inhibit the relative movement in the direction of circumference of the second main body member and the inner circumference support metal part.

A vibration isolation device of a fifteenth embodiment is characterized in that, in the vibration isolation device of any of the eleventh to fourteenth embodiments, the screen member is fixed inside the second main body member, and the inner circumference support metal part is in contact with the screen member, and the relative movement prevention member is configured such that at least one of the contact surface of the inner circumference support metal part with the screen member or the contact surface of the screen member with the inner circumference support metal part includes a high friction surface having a higher friction coefficient than that of the smooth surface.

When the screen member is fixed inside the second main body member, and the screen member and the inner circumference support metal part are in contact with each other, the relative movement to the direction of circumference of the second main body member and the inner circumference support metal part can also be inhibited by thus forming a high friction surface and increasing the friction force of the contact surface of the screen member and the inner circumference support metal part.

A vibration isolation device of a sixteenth embodiment is characterized in that, in the vibration isolation device of any one of the eleventh to fifteenth embodiments, the screen member is fixed inside the second main body member, and the inner circumference support metal part is in contact with the screen member, and the relative movement prevention member comprises a convex part to be engaged in a concave part formed in one of the inner circumference support metal part or the screen member and a concave part formed in the other in the contact part between the inner circumference support metal part and the screen member.

When the screen member is fixed inside the second main body member, and the screen member and the inner circumference support metal part are in contact with each other, the relative movement in the direction of circumference of the second main body member and the inner circumference support metal part can also be inhibited by thus forming an uneven shape on the screen member and the inner circumference support metal part for engagement thereof.

A vibration isolation device of a seventeenth embodiment is characterized in that, in the vibration isolation device of any one of the sixth to sixteenth embodiments, the restriction passage is provided in the screen member.

Further, a vibration isolation device of an eighteenth embodiment is characterized by including; in the vibration isolation device of any one of the sixth to seventeenth embodiments, a hollow storage chamber provided inside the screen member; a first opening for establishing communication between the storage chamber and the main liquid chamber; a second opening for establishing communication between the storage chamber and the sub liquid chamber; and a circulation control plate placed in the storage chamber, and upon input of vibration to the connection member or the first main body member, coming in contact with and moving away from the peripheral part of the first opening and the peripheral part of the second opening in the inner wall surface of the storage chamber in synchronism with the input vibration, and alternately opening and closing the first opening and the second opening, to thereby control liquid circulation between the main liquid chamber and the sub liquid chamber through the storage chamber.

Still further, a vibration isolation device of a nineteenth embodiment is characterized in that, in the vibration isolation device of the eighteenth embodiment, the storage chamber is formed so as to extend along the direction of circumference about the connection member as the center, and the circulation control plate extends along the direction of circumference about the vicinity of the connection member as the center, and is formed in a substantially C shape with both ends thereof being movable ends.

Further, a vibration isolation device of a twentieth embodiment is characterized in that, in the vibration isolation device of the eighteenth embodiment or the nineteenth embodiment, at least the peripheral part of the first opening and the peripheral part of the second opening in the inner wall surface of the storage chamber are formed of an elastic material.

Advantage of the Invention

As described up to this point, in accordance with the vibration isolation device of the present invention, the length along the axial direction of the connection member can be set sufficiently long without expanding the device sizes. In addition, there can be provided a stopper mechanism for restricting excessive displacement along the backward and forward direction or the sideway direction orthogonal to the axial direction of the connection member.

BEST MODE FOR CARRYING OUT THE INVENTION

Below, a vibration isolation device in accordance with an embodiment of the present invention will be described by reference to the accompanying drawings.

First Embodiment

Figure 1A:
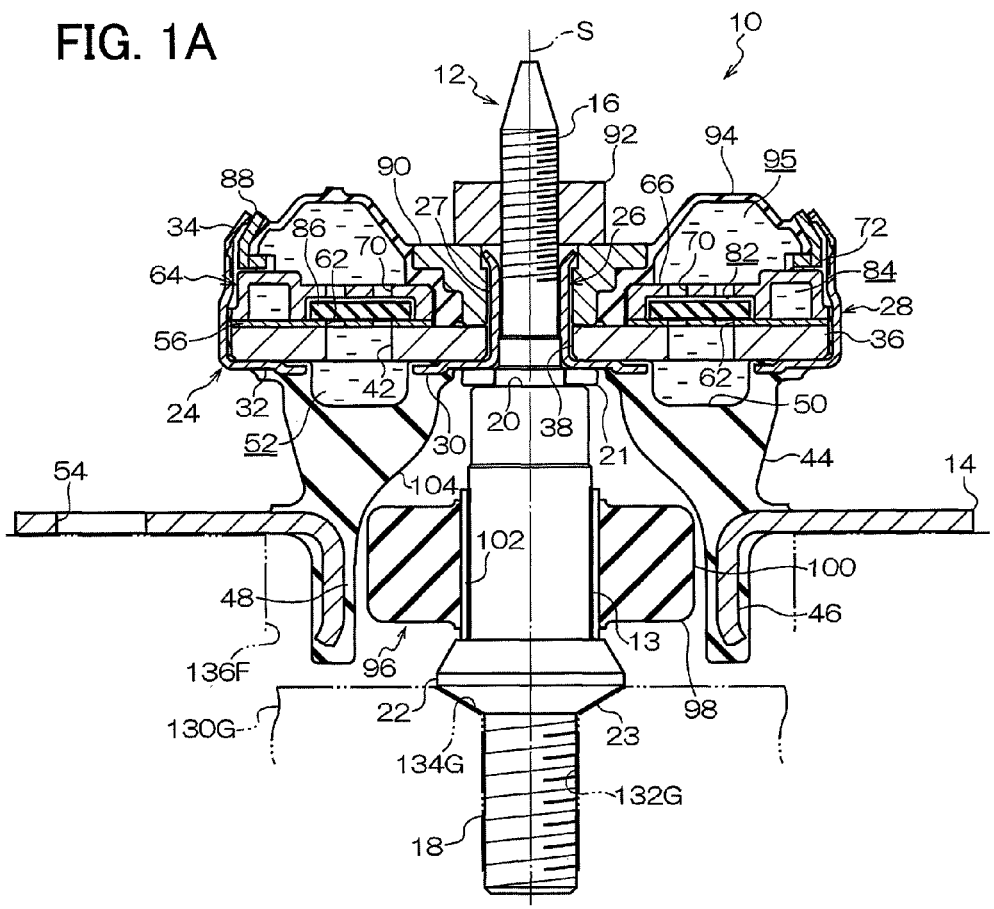
FIG. 1A A side cross sectional view showing a configuration of a vibration isolation device in accordance with a first embodiment.

FIG. 1A shows a vibration isolation device in accordance with the first embodiment of the invention. The vibration isolation device 10 is to be applied as a mount device for supporting a power unit including an engine and a gear box which are the vibration generation parts in a vehicle such as a car to the car body which is the vibration receptive part. Incidentally, in FIG. 1A, a reference sign S denotes the axis of the device. Below, a description will be given with the direction along the axis S taken as the axial direction of the device.

As shown in FIG. 1A, in the vibration isolation device 10, a substantially round rod-like connection rod 12 extending in the axial direction is provided at the central part, and a plate-like main body plate 14 is disposed on the outer circumferential side of the connection rod 12. In the connection rod 12, a rod main body 13 with a substantially given outer diameter is disposed at the intermediate part in the axial direction, and a screw shaft 16 and a screw shaft 18 are integrally disposed on the upper end side and on the lower end side with respect to the rod main body 13. Herein, the screw shaft 16 is set to have a smaller diameter than that of the rod main body 13. As a result of this, an annular step part 20 is formed between the rod main body 13 and the screw shaft 16. On the outer circumferential side of the screw shaft 16, a ring-like spacer 21 is fitted so as to be in contact with the step part 21.

The screw shaft 18 of the connection rod 12 is set to be a little smaller than that of the rod main body 13. Between the rod main body 13 and the screw shaft 18 in the connection rod 12, a collar part 22 with a larger diameter than that of the rod main body 13 is integrally formed. The bottom surface side of the collar part 22 is a tapered contact surface 23 inclined with respect to the axial direction. In the vibration isolation device 10, a main body casing 24 formed in a substantially bottomed cylindrical shape is disposed on the outer circumferential side of the screw shaft 16. In the main body casing 24, an internal tube metal part 26 in a substantially cylindrical shape is disposed on the inner circumferential side, and on the outer circumferential side of the inner tube metal part 26, an outer tube metal part 28 in a substantially cylindrical shape is disposed. In the inner tube metal part 26, an annular flange part 30 extending toward the inner circumference is formed in a bent manner at the lower end. Also in the outer tube metal part 28, an annular flange part 32 extending toward the inner circumference is formed in a bent manner at the lower end, and a swaging part 34 decreasing in inner and outer diameters toward the top is formed on the upper end.

Figure 2:
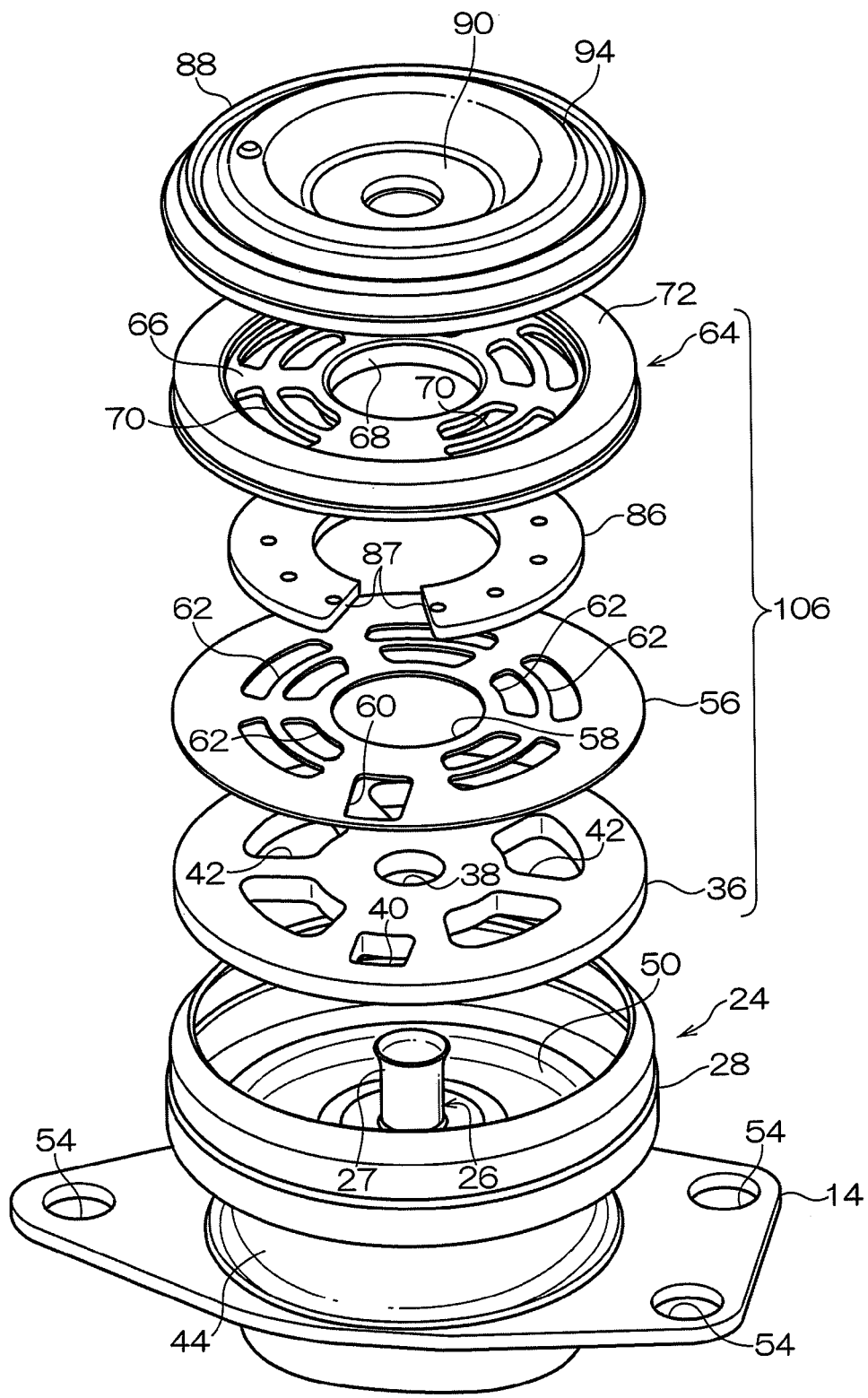
FIG. 2 An exploded perspective view of a main body casing and components to be placed in the main body casing in the vibration isolation device in accordance with the first embodiment.

Further, in the main body casing 24, an annular bottom plate 36 which has been fitted by insertion from the upper end side into the annular space formed between the inner tube metal part 26 and the outer tube metal part 28, and has come in contact with the flange parts 30 and 32 is disposed. In the bottom plate 36, as shown in FIG. 2, a circular insertion hole 38 through which the tube part 27 of the inner tube metal part 26 is inserted is bored at the central part, and a lower communication hole 40 and a plurality of circulation holes 42 are bored on the outer circumferential side of the insertion hole 38. The lower communication hole 40 is formed in a substantially rectangular shape, and the circulation holes 42 are each formed in a substantially fan shape expanding in opening width from the inner circumferential side toward the outer circumference.

As shown in FIG. 1A, in the vibration isolation device 10, the main body plate 14 is placed below the main body casing 24. Between the main body plate 14 and the main body casing 24, a rubber elastic body 44 formed in a substantially cylindrical shape is placed. Further, at the main body plate 14, a substantially cylindrical stopper receptive part 46 penetrating in the axial direction is integrally formed in the vicinity of the central part. The connection rod 12 passes through the inner circumferential side of the stopper receptive part 46, and protrudes upwardly and downwardly of the main plate 14. Herein, the stopper receptive part 46 is formed such that the cross sectional shape along the direction orthogonal to the axis is formed in an ellipse whose minor axis direction (direction of an arrow DS of FIG. 1B) is the longitudinal direction of the main body plate 14.

Figure 1B:
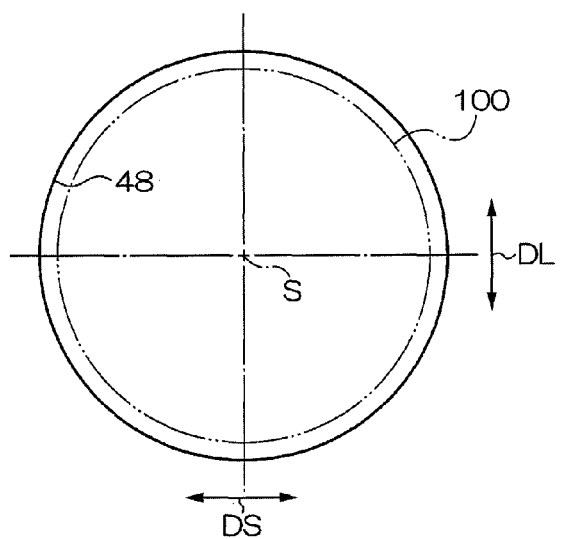
FIG. 1B A schematic top view showing a shape of a stopper surface of the vibration isolation device in accordance with the first embodiment.

The rubber elastic body 44 is vulcanization bonded to the flange part 32 of the outer tube metal part 28 on the outer circumferential side of the upper end face, and is vulcanization bonded to the flange part 30 of the inner tube metal part 26 on the inner circumferential side of the upper end face. Further, the rubber elastic body 44 is vulcanization bonded to the tope surface side of the main body plate 14 at the lower end. As a result of this, the rubber elastic body 44 elastically bonds the main body casing 24 and the main body plate 14. Further, in the rubber elastic body 44, a cover part 48 covering the inner circumferential surface and the outer circumferential surface of the stopper receptive part 46 of the main body plate 14 is integrally formed. Herein, as shown in FIG. 1B, the cover part 48 covering the inner circumferential side of the stopper receptive part 46 is configured such that the wall thickness along the direction of minor axis (direction of an arrow DS) is small, and the wall thickness along the direction of major axis (direction of an arrow DL) is large, and the inner circumferential surface is formed in a curved surface with a constant radius of curvature about the axis S as the center.

As shown in FIG. 1A, in the upper end face of the rubber elastic body 44, a concave part 50 is formed between the outer circumferential end of the flange part 30 and the inner circumferential end of the flange part 32. The concave part 50 is in a substantially rectangular shape radially elongated in cross section, and extends in a ring shape along the direction of circumference about the axis S as the center. In the inside of the concave part 50, the upper end side thereof is closed by the bottom plate 36, so that an annular liquid chamber space comparted from the outside is formed. The liquid chamber space serves as a main liquid chamber 52 which expands or shrinks in internal volume with the elastic deformation of the rubber elastic body 44 by being charged inside with a liquid such as water or ethylene glycol. Further, in the rubber elastic body 44, a substantially cylindrical cavity part 104 penetrating in the axial direction is formed in the inner circumferential part thereof. The cavity part 104 is formed in a substantially truncated cone gradually expanding in inner diameter from the lower end of the main body casing 24 to the vicinity of the upper end face of the main body plate 14.

As shown in FIG. 2, in the main body plate 14, a plurality of connection holes 54 penetrating in the axial direction are bored in the portion on the outer circumferential side. With the vibration isolation device 10, the portion on the outer circumferential side of the main body plate 14 is mounted on the car body 136F (see FIG. 1A) in a vehicle, and the main body plate 14 is fastened on the car body 136F by fastening members (not shown) such as bolts respectively inserted into a plurality of the connection holes 54. Further, in the vibration isolation device 10, as shown in FIG. 1A, the screw shaft 18 of the connection rod 12 is screwed into a screw hole 132G provided in a gear box 130G forming a part of the power unit, so that the lower end of the connection rod 12 is connected with the gear box 130G. Herein, at the peripheral part of the opening end of the screw hole 132G in the gear box 130Q a receptive surface 134G including an inclined surface corresponding to the contact surface 23 of the connection rod 12 is formed. The contact surface 23 is pressed against the receptive surface 134G, so that the vibration isolation device 10 is automatically positioned to a prescribed mounting position with respect to the gear box 130G.

As shown in FIG. 1A, in the main body casing 24, on the upper side of the bottom plate 36, a ring-like bottom cover member 56 and an orifice member 64 are stored in a stacked manner along the axial direction. As shown in FIG. 2, the bottom cover member 56 is formed in a disk with a constant thickness as a whole by an elastic material such as rubber or a material having flexibility such as a resin. The outer diameter thereof is approximately in agreement with the outer diameter of the bottom plate 36. In the bottom cover member 56, a circular insertion hole 58 through which the tube part 27 of the inner tube metal part 26 is inserted is formed at the central part thereof. In addition, on the outer circumferential side of the insertion hole 58, an intermediate communication hole 60 and a plurality of lower openings 62 are bored.

Herein, the intermediate communication hole 60 is formed in a substantially rectangular shape, and placed so as to face the lower communication hole 40 of the bottom plate 36. Further, a plurality of the lower openings 62 are each formed in an elongated slit along the direction of circumference. In the bottom cover member 56, a plurality of the lower openings 62 are arranged along the direction of circumference, and the lower openings 62 are placed on the outer circumferential side and on the inner circumferential side, respectively, along the direction of radius. In the vibration isolation device 10, a pair of the lower openings 62 placed along the direction of radius of the bottom cover member 56 are placed so as to face one circulation opening 42 in the bottom plate 36.

The orifice member 64 is formed in a substantially bottomed shallow cylindrical shape closed by a top plate part 66 in a disk shape on the upper end side. The outer diameter thereof is approximately in agreement with the outer diameter of the bottom cover member 56. In the orifice member 64, as shown in FIG. 3B, at the central part of the top plate part 66, a cylindrical insertion part 68 is formed in such a manner as to downwardly protrude. In the insertion part 68, the tube part 27 of the inner tube metal part 26 is inserted. Further, in the orifice member 64, a plurality of upper openings 70 are bored on the outer circumferential side of the insertion part 68 in the top plate part 66. Herein, a plurality of the upper openings 70 have substantially the same shape and arrangement as those of the lower openings 62 in the bottom cover member 56.

Further, in the orifice member 64, on the outer circumferential side of the top plate part 66, a downwardly opening tub-like part 72 bent in a roughly U shape is integrally formed.

Figure 3A:
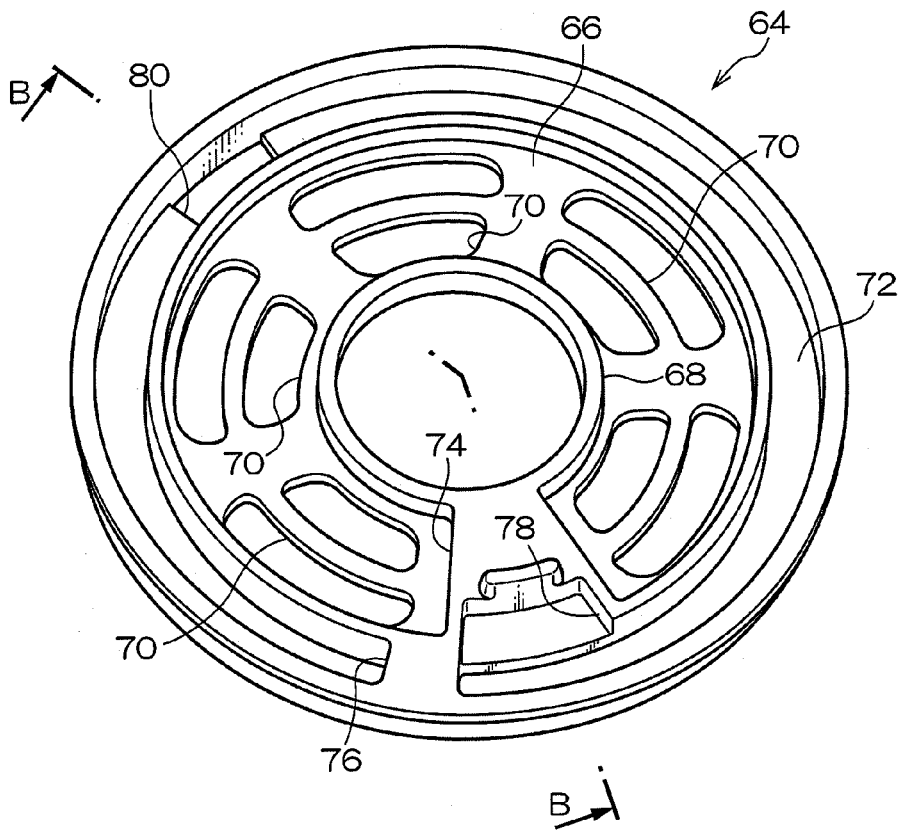
FIG. 3A A perspective view, as seen from below, of an orifice member to be placed in the main body casing in the vibration isolation device in accordance with the first embodiment.
Figure 3B:
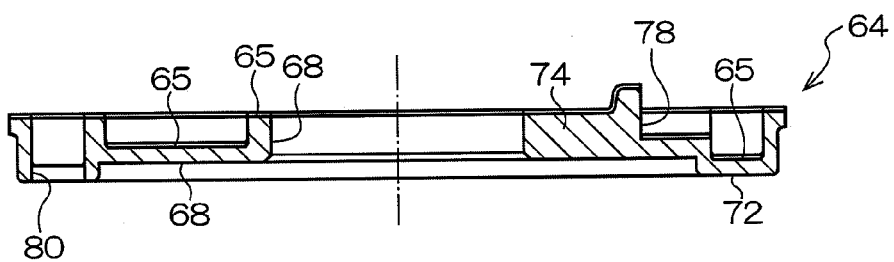
FIG. 3B A side cross sectional view of an orifice member to be placed in the main body casing in the vibration isolation device in accordance with the first embodiment.

As shown in FIG. 3A, a closing part 74 extending from the outer circumferential surface of the insertion part 68 to the tub-like part 72 is formed. The closing part 74, the insertion part 68, and the tub-like part 72 are flush with each other at their respective lower end faces. In the closing part 74, a substantially rectangular circulation concave part 78 opening in such a manner as to face the inside of the tub-like part 72 on the outer circumferential side is formed. The circulation concave part 78 is placed so as to face the intermediate communication hole 60 of the bottom cover member 56. Further, in the orifice member 64, the closing part 74 traversing along the direction of radius inside the tub-like part 72 is formed. The lower end face of the closing part 74 is flush with the lower end face of the tub-like part 72. In the tub-like part 72, a rectangular upper communication hole 80 is bored at a site at a distant of a prescribed distance from the closing part 74 along the direction of circumference.

With the vibration isolation device 10, the orifice member 64, the bottom cover member 56, and the bottom plate 36 disposed between the main liquid chamber 52 and the sub liquid chamber 95 along the axial direction are configured as a screen member 106 respectively forming a part of each inner wall surface of the main liquid chamber 52 and the sub liquid chamber 95. As shown in FIG. 3B, to the lower end face of the orifice member 64, a film-like rubber film 65 is bonded by vulcanization bonding. The rubber films 65 are also respectively bonded to the bottom surface sides of the top plate part 66 and the tub-like part 72.

As shown in FIG. 1A, with the vibration isolation device 10, the lower end side of the orifice member 64 is closed by the bottom cover member 56. As a result, a storage chamber 82 which is a space flat in the axial direction is formed between the bottom cover member 56 and the top plate part 66 of the orifice member 64. In addition, an elongated space extending in the direction of circumference is formed in the tub-like part 72. The space is filled with the same liquid as that of the main liquid chamber 52, resulting in an orifice passage 84. Herein, the storage chamber 82 extends in a C shape along the direction of circumference about the axis S as the center, and the opposite ends thereof are closed by the closing part 76. Further, the orifice passage 84 also extends in a C shape along the direction of circumference about the axis S as the center, and the opposite ends thereof are closed by the closing part 78. The orifice passage 84 is set (tuned) so that the path length and the cross sectional area, i.e., the circulation resistance of the liquid is adapted to, for example, the shake vibration.

With the vibration isolation device 10, a movable membrane 86 made of rubber is placed in the storage chamber 82. The movable membrane 86 is, as shown in FIG. 2, formed in a roughly C shape with given internal diameter and outer diameter by a rubber plate having a prescribed thickness. The portion corresponding to the closing part 76 in the direction of circumference thereof is cut in a fan shape. As a result, the movable membrane 86 is configured such that the opposite ends of the movable membrane 86 are movable ends 77 each of which the deformation resistance along the direction of thickness is smaller than at the intermediate part in the direction of circumference. The movable membrane 86 has a little larger internal diameter than the outer diameter of the insertion part 68, and has a little smaller outer diameter than the internal diameter of the tub-like part 72. Further, the movable membrane 86 has a thickness smaller than the dimension along the axial direction of the storage chamber 82 by a prescribed dimension. This enables the movable membrane 86 to move (vibrate) along the axial direction within the range approximately in agreement with the difference between the thickness of the movable membrane 86 and the dimension along the axial direction of the storage chamber 82 in the storage member 82.

Herein, the difference between the thickness of the movable membrane 86 and the dimension along the axial direction of the storage chamber 82 is set in accordance with the amplitude (e.g., about 0.5 mm to 1 mm) of the shake vibration which is the vibration in the low frequency region (e.g., 8 to 12 Hz) occurring during running of a vehicle.

As shown in FIG. 1A, with the vibration isolation device 10, on the inner circumferential side of the outer tube metal part 28, and on the upper side of the orifice member 64, a thin wall cylindrical connection metal part 88 is fitted by insertion. The connection metal part 88 is restricted on movement in the axial direction, and is fixed in the outer tube metal part 28 by the swaging part 34 by swaging of the swaging part 34 of the outer tube metal part 28 into a taper during assembly of the vibration isolation device 10.

With the vibration isolation device 10, on the outer circumferential side of the inner tube metal part 26 and on the upper side of the bottom plate 36 and the orifice member 64, a substantially thick wall cylindrical connection ring 90 is fitted by insertion, and a fixing nut 92 to be screwed onto the screw shaft 16 of the connection rod 12 is provided. With the vibration isolation device 10, the fixing nut 92 is screwed onto the screw shaft 16 until it is pressed against the upper end face of the connection ring 90. As a result of this, the connection ring 90 is fixed between the bottom plate 36 and the orifice member 64 and the fixing nut 92. Further, the bottom plate 36, the bottom cover member 56, and the orifice member 64 are interposed by the rubber elastic body 44, the connection metal part 88, and the connection ring 90 along the axial direction, and thereby restricted on movement in the axial direction to be fixed in the main body casing 24.

As shown in FIG. 1A, with the vibration isolation device 10, an annular diaphragm 94 put across the connection metal part 88 and the connection ring 90 is provided. The diaphragm 94 is formed in a thin film shape of, for example, a rubber material of NR/EPDM type excellent in ozone resistance. The outer circumferential part of the diaphragm 94 is vulcanization bonded on the inner circumferential side of the connection metal part 88 throughout the entire circumference thereof, and the inner circumferential part is vulcanization bonded on the inner circumferential side of the connection ring 90 throughout the entire circumference thereof. As a result of this, the space between the connection metal part 88 and the connection ring 90 is closed by the diaphragm 94. The diaphragm 94 is set in a state slackened so as to swell out along the axial direction between the connection metal part 88 and the connection ring 90. Thus, the diaphragm 94 is deformable in the axial direction by a relatively small load (liquid pressure).

With the vibration isolation device 10, an annular liquid chamber space comparted from the outside is formed between the orifice member 64 and the diaphragm 94 in the main body casing 24. The liquid chamber space is filled inside with the same liquid as that in the main liquid chamber 52, thereby to serve as the sub liquid chamber 95 capable of expanding and shrinking in internal volume by the deformation of the diaphragm 94. The main liquid chamber 52 and the sub liquid chamber 95 communicate with each other through the lower communication hole 40 of the bottom plate 36, the intermediate communication hole 60 of the bottom cover member 56, the orifice passage 84, and the upper communication hole 80 of the orifice member 64.

As shown in FIG. 1A, with the vibration isolation device 10, an annular stopper member 96 fitted by insertion and fixed to the outer circumferential side of the rod main body 13 of the connection rod 12 is provided. In the stopper member 96, a thin wall cylindrical metal sleeve 102 is provided on the inner circumferential side thereof, and a thick wall cylindrical stopper rubber 98 is placed on the outer circumferential side of the metal sleeve 102. The metal sleeve 102 is fitted by insertion on the outer circumferential side of the rod main body 13, and fixed in a state in contact with the upper end of the collar part 22.

The stopper rubber 98 is configured such that the outer circumferential surface thereof is the stopper surface 100, and such that the inner circumferential surface thereof is attached to the outer circumferential surface of the metal sleeve 102 by vulcanization bonding. As a result of this, the stopper rubber 98 is supported such that the stopper surface 100 faces the internal circumferential surface of the stopper receptive part 46 of the main body plate 14 via the cover part 48. Further, the stopper rubber 98 is formed of a rubber material of a different type from the rubber elastic body 44.

Specifically, the rubber elastic body 44 is formed of a high damping rubber material such as NR/SBR type rubber in order to implement a favorable vibration damping property with respect to vibration in the low frequency region such as shake vibration. On the other hand, the stopper rubber 98 is formed of a rubber material low in dynamic-to-static modulus ratio such as a NR type rubber in order to implement a favorable vibration isolation property upon input of vibration in the high frequency region. However, with the vibration isolation device 10, upon input of vibration in the low frequency region, attenuation with respect to vibration in the low frequency region can be generated by the resonance phenomenon (liquid column resonance) occurring in the liquid circulating through the orifice passage 84. Therefore, the rubber elastic body 44 may also be formed of a rubber material with a low dynamic-to-static modulus ratio.

Herein, for the stopper rubber 98, the thickness along the axial direction is a little smaller than the width of the stopper receptive part 46 of the main body plate 14, and the outer diameter thereof is smaller than the minimum internal diameter (minor axis) of the cover part 48 covering the stopper receptive part 46 by a prescribed length. As a result of this, as shown in FIG. 1B, a gap of which the width along the direction of radius at a given position along the direction of circumference is substantially constant at a given position along the direction of circumference is formed between the inner circumferential surface of the cover part 48 and the stopper surface 100.

Then, a description will be given to the operation and the advantage of the vibration isolation device 10 in accordance with a first embodiment of the invention, configured in the foregoing manner. With the vibration isolation device 10, upon input of vibration from the gear box 130G side, the rubber elastic body 44 which is the vibration absorption main body is elastically deformed due to the vibration. As a result of this, the input vibration is attenuated and absorbed by the rubber elastic body 44. At this step, even when the input vibration is any of a longitudinal vibration oscillating along the axial direction, or a transverse vibration oscillating along the direction orthogonal to the axis, the input vibration is attenuated and absorbed by elastic deformation of the rubber elastic body 44 upon input of vibration.

Further, in the vibration isolation device 10, upon input of vibration from the gear box 130, the rubber elastic body 44 is elastically deformed in synchronism with the vibration input. Then, the internal volume of the main liquid chamber 52 expands or shrinks, and the liquid pressure in the main liquid chamber 52 changes. With the change in liquid pressure, the liquid reciprocally circulates between the main liquid chamber 52 and the sub liquid chamber 95 through the orifice passage 84. In addition, the liquid pressure (pressure wave) periodically changing in synchronism with the input vibration acts on the movable membrane 86 stored in the storage chamber 82 communicating with the main liquid chamber 52 through the lower opening 62. Thus, the movable membrane 86 which has received the pressure wave reciprocates (vibrates) within the movable region in agreement with the difference in dimension between the movable membrane 86 and the storage chamber 82 along the axial direction in the storage chamber 82. As a result of this, the top surface part and the bottom surface part of the movable membrane 86 repeat the operation of coming in contact with and moving away from the bottom cover part 56 and the top plate part 66 of the orifice member 64. When the movable membrane 86 comes in contact with the bottom cover member 56, it closes the lower opening 62. Further, when the movable membrane 86 comes in contact with the top plate part 66, it closes the upper opening 70.

Further, with the vibration isolation device 10, upon input of vibration, the liquid pressure in the main liquid chamber 52 relatively increases with respect to the liquid pressure in the sub liquid chamber 95. Then, the movable membrane 86 receives the liquid pressure (positive pressure) of the main liquid chamber 52. As a result, the movable membrane 86 moves upwardly. Further, upon input of vibration, the liquid pressure in the main liquid chamber 52 relatively decreases with respect to the liquid pressure in the sub liquid chamber 95. Then, the movable membrane 86 receives the liquid pressure (negative pressure) of the main liquid chamber 52. As a result, the movable membrane 86 moves downwardly.

With the vibration isolation device 10, when the frequency of the input vibration is equal to or less than the frequency of the shake frequency (e.g., 8 to 12 Hz), and the amplitude is large (e.g., in the case of about 0.5 mm to 1 mm), immediately after the change in direction of liquid pressure change of the main liquid chamber 52 (change from increase to decrease, or from decrease to increase), the movable membrane 86 comes in contact with one of the bottom cover member 56 and the top plate part 66. This substantially inhibits the liquid circulation between the main liquid chamber 52 and the sub liquid chamber 95 through the storage chamber 82.

Therefore, with the vibration isolation device 10, upon input of shake vibration, a liquid ceases to circulate between the main liquid chamber 52 and the sub liquid chamber 95 through the storage chamber 82. Thus, the liquid reciprocally circulates between the main liquid chamber 52 and the sub liquid chamber 95 through only the orifice passage 84. As a result, with the vibration isolation device 10, when the input vibration is particularly shake vibration, the resonance phenomenon (liquid column resonance) occurs in the liquid circulating through the orifice passage 84. By the action of the liquid column resonance, it is possible to in particular effectively attenuate the input vibration (shake vibration).

Further, in the vibration isolation device 10, when the frequency of the input vibration is higher than the frequency of the shake vibration, and the amplitude is small, for example, when the input vibration is an idle vibration (e.g., 20 to 30 Hz), and the amplitude is about 0.1 mm to 0.2 mm, the orifice passage 84 tuned so as to be adaptable to the shake vibration is in a clogged state. As a result, the liquid becomes less likely to circulate through the orifice passage 84.

At this step, with the vibration isolation device 10, the movable membrane 86 vibrates along the axial direction in the storage chamber 82 with the periodical change in liquid pressure of the main liquid chamber 52. However, the amplitude is smaller than the difference in dimension between the movable membrane 86 and the storage chamber 82. For this reason, the movable membrane 86 will not come in contact with any of the bottom cover member 56 and the top plate part 66 in a complete surface contact state. Thus, both of the lower opening 62 of the bottom cover part 56 and the upper opening 70 of the top plate part 66 are kept in a state restrictively opened by the movable membrane 86, respectively.

Therefore, with the vibration isolation device 10, upon input of high frequency vibration such as idle vibration, the orifice passage 84 is in a clogged state. As a result, a liquid becomes less likely to circulate through the orifice passage 84. However, the liquid in the main liquid chamber 52 flows into the sub liquid chamber 95 through the storage chamber 82 so as to inhibit the increase in liquid pressure in the main liquid chamber 52. As a result, it is possible to inhibit the increase in spring constant of the device due to the increase in liquid pressure in the main liquid chamber 52. Thus, also upon input such high frequency region vibration, the dynamic spring constant of the rubber elastic body 44 can be kept low, so that the high frequency vibration can also be effectively absorbed by the elastic deformation of the rubber elastic body 44.

Figure 4:
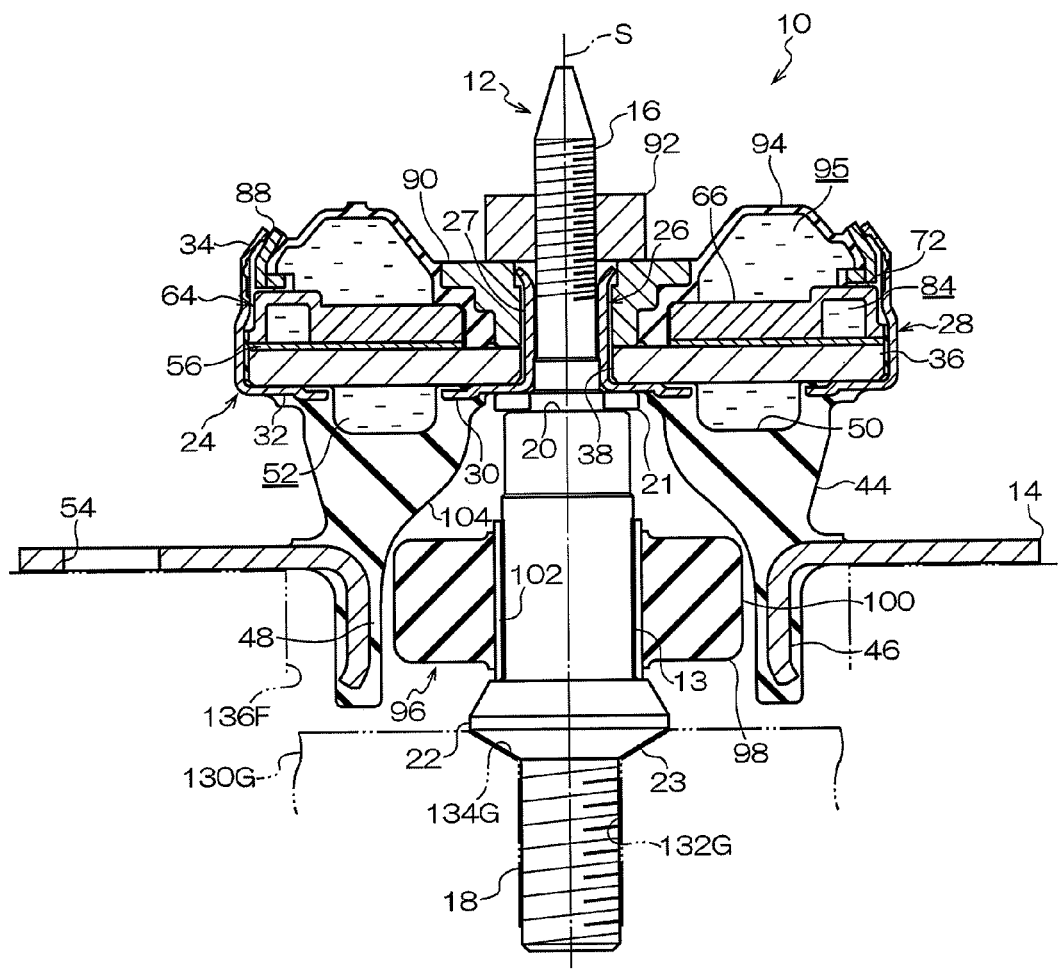
FIG. 4 A side cross sectional view showing a configuration when a storage chamber and a movable membrane have been omitted from the vibration isolation device in accordance with the first embodiment.

Incidentally, with the vibration isolation device 10, the increase in dynamic spring constant of the rubber elastic body 44 can be effectively inhibited upon input of high frequency vibration by the movable membrane 86. However, the movable membrane 86 impinges with the bottom plate member 56 and the top plate part 66 in synchronism with the input vibration, so that impact sound is generated. When such a flap becomes a more important problem than the increase in dynamic spring constant upon input of high frequency vibration, as shown in FIG. 4, it is also acceptable that the storage chamber 82 provided in the orifice member 64 is omitted, and that the placement of the movable membrane 86 in the storage chamber 82 is stopped. As a result of this, in accordance with the vibration isolation device 10 shown in FIG. 5A, as compared with the one shown in FIG. 1A, the impact sound upon vibration of the movable membrane 86 ceases to be generated, and the structure of the device can be simplified.

Further, in the vibration isolation device 10 in accordance with this embodiment, the cavity part 104 through which the connection rod 12 penetrates is formed at the central part of the rubber elastic body 44, and the stopper rubber 98 is placed in the cavity part 104. In addition, the stopper rubber 98 is fixed on the outer circumferential side of the rod main body 13 of the connection rod 12. Thus, the stopper rubber 98 faces the internal circumferential surface of the stopper receptive part 46 of the main body plate 14 with a prescribed gap interposed therebetween. As a result, when a load along the direction orthogonal to axis (the backward and forward direction or the sideway direction of the vehicle) is inputted to the device via the connection rod 12, elastic deformation along the prying direction occurs in the rubber elastic body 44, and the connection rod 12 undergoes displacement along the direction orthogonal to axis while oscillating about the connection part with the main body casing 24 as the center.

At this step, when the input load is small, and the displacement amount along the direction orthogonal to axis of the connection rod 12 is smaller than the gap between the outer circumferential surface of the stopper rubber 98 and the inner circumferential surface of the cover part 48, displacement along the direction orthogonal to axis of the connection member is not restricted by the stopper receptive part 46. Thus, the displacement (vibration) along the direction orthogonal to axis of the connection rod 12 occurring with load input is gradually attenuated and absorbed by the elastic deformation of the rubber elastic body 44.

Further, when the input load is large, and larger displacement than the gap between the outer circumferential surface of the stopper rubber 98 and the inner circumferential surface of the cover part 48 occurs in the connection rod 12, the stopper rubber 98 is pressed against the cover part 48, and the stopper rubber 98 and the cover part 48 undergo elastic deformation (compression deformation). The displacement along the direction orthogonal to axis of the connection rod 12 is restricted by the elastic deformation resistance of the stopper rubber 98 and the cover part 48. In addition, transfer of vibration between the connection rod 12 and the main body plate 14 is suppressed by the stopper rubber 98 and the cover part 48.

Further, in the vibration isolation device 10, the connection rod 12 penetrates through the cavity part 104 of the rubber elastic body 44 and the inner circumferential side of the main body plate 14. In addition, the stopper rubber 98 fixed on the outer circumferential side of the rod main body 13 of the connection rod 12 is placed in the cavity part 104 of the rubber elastic body 44. This allows the rod main body 13 aligned in overlying relation with the rubber elastic body 44 along the axial direction of the connection rod 12 to be stored in the device. Thus, the stopper member 96 fixed to the rod main body 13 of the connection rod 12 can form the stopper mechanism. Therefore, the dimension along the axial direction of the connection rod 12 can be elongated while suppressing the increase in dimension along the axial direction of the device. In addition, the dimension along the axial direction of the device can be prevented from expanding by the stopper mechanism for preventing the excessive displacement along the direction orthogonal to the axis of the connection rod 12.

Further, in the vibration isolation device 10, the wall thickness of the cover part 48 along the direction of the minor axis of the stopper receptive part 46 is set relatively thin, and the wall thickness of the cover part 48 along the direction of the major axis of the stopper receptive part 46 is set relatively thick. As a result of this, for example, the vibration isolation device 10 is placed between the gear box 130G and the car body 136F so that the direction of the major axis of the stopper receptive part 46 is substantially in agreement with the backward and forward direction of the vehicle, and so that the direction of the minor axis of the stopper receptive part 46 is substantially in agreement with the sideway direction of the vehicle. This can relatively reduce the increase in spring constant with respect to the increase in displacement amount of the connection rod 12 when the connection rod 12 undergoes larger displacement than the gap between the outer circumferential surface of the stopper rubber 98 and the internal circumferential surface of the cover part 48 along the backward and forward direction of the vehicle. In addition, this can relatively increase the increase in spring constant with respect to the increase in displacement amount of the connection rod 12 when the connection rod 12 undergoes larger displacement than the gap between the outer circumferential surface of the stopper rubber 98 and the internal circumferential surface of the cover part 48 along the sideway direction of the vehicle.

As a result of this, the vibration in the backward and forward direction largely affecting the ride comfort can be effectively isolated by the stopper rubber 98 and the cover part 48.

In addition, the displacement along the sideway direction of the gear box 130G largely affecting the handling stability can be effectively suppressed.

Incidentally, in this embodiment, the shape along the direction orthogonal to axis of the internal circumferential surface of the stopper receptive part 46 is formed in a non-circle, and the wall thickness of the cover part 48 is made different between the direction of major axis and the direction of minor axis. However, even when the wall thickness of the stopper rubber 98 is made different between the direction of major axis and the direction of minor axis, or the wall thicknesses of the cover part 48 and the stopper rubber 98 are respectively made different between the direction of major axis and the direction of minor axis, the same effects as the effects described above are produced.

Further, in the vibration isolation device 10, the main liquid chamber 52, the sub liquid chamber 95, and the orifice passage 84 are placed on the outer circumferential side of the connection rod 12, respectively. This can prevent the dimension along the axial direction of the device from expanding even when the main liquid chamber 52, the sub liquid chamber 95, and the orifice passage 84 are provided.

Namely, with the vibration isolation device 10 in accordance with this embodiment, the rubber elastic body 44, the main liquid chamber 52, the sub liquid chamber 95, and the screen member 106 (the orifice member 64, the bottom cover member 56, and the bottom plate 36) are respectively formed in a ring shape. In addition, these are placed on the outer circumferential side of the connection rod 12 so as to surround the connection rod 12. As a result, the intermediate part in the axial direction of the connection rod 12 can be placed so as to be aligned in overlying relation with the rubber elastic body 44, the main liquid chamber 52, the sub liquid chamber 95, and the screen member 106 along the axial direction. Therefore, it is possible to elongate the dimension along the axial direction of the connection rod 12 while suppressing the increase in dimension along the axial direction of the device.

Further, with the vibration isolation device 10, the sub liquid chamber 95 is provided so as to face the main liquid chamber 52 along the axial direction with the screen member 106 interposed therebetween. Thus, the sub liquid chamber 95 can be placed so as to be aligned in overlying relation with the main liquid chamber 52 along the radial direction. For this reason, as compared with a conventional vibration isolation device in which the sub liquid chamber 95 is placed on the outer circumferential side of the main liquid chamber 52, the dimension along the radial direction of the device can also be reduced.

As a result of this, with the vibration isolation device 10 in accordance with this embodiment, the length along the axial direction of the connection rod 12 can be set sufficiently long without expanding the device sizes along the radial direction and the axial direction.

Further, in the vibration isolation device 10 in accordance with this embodiment, the diaphragm 94 is formed as a different unit from the main body rubber 44. Thus, as compared with a conventional vibration isolation device in which the diaphragm is formed integrally with the rubber elastic body, the diaphragm 94 can be formed of a rubber material of NR/EPDM type excellent in ozone resistance irrespective of the material (rubber type) of the rubber elastic body 44. Therefore, the diaphragm 94 can be prevented from undergoing the occurrence of damages such as cracks caused by ozone deterioration or the like for a long period. Further, the degree of freedom of design for each dimension such as the wall thickness of the diaphragm 94 is enhanced. For this reason, it becomes possible to design the diaphragm 94 in a shape resistant to occurrence of a stress concentration part at which a strong repeating stress occurs. This can also improve the durability of the diaphragm 94.

Particularly, the connection ring 90 is bonded on the inner circumferential part of the diaphragm 94 throughout the entire circumference thereof, and the connection ring 90 is fitted by insertion and fixed to the outer circumferential side of the tube part 27 of the inner tube metal part 26. In addition, the connection metal part 88 is bonded on the inner circumferential part of the diaphragm 94 throughout the entire circumference thereof, and the connection metal part 88 is fitted by insertion and fixed to the inner circumferential side of the outer tube metal part 28. Thus, the connection ring 90 and the connection metal part 88 are connected to the main body casing 24. As a result, the connection part with the main body casing 24 in the diaphragm 94 (the inner circumferential part and the outer circumferential part of the diaphragm 94) can be made sufficiently long. For this reason, it becomes possible to effectively inhibit the stress concentration at the connection part between the diaphragm 94 and the main body casing 24, and to effectively prevent damages of the connection part in the diaphragm 94.

Further, in the vibration isolation device 10, the storage chamber 82 provided in the inside of the screen member 106 extends in the direction of circumference about the axis S as the center, and is formed in a C shape with opposite ends respectively closed. The movable membrane 86 to be stored in the storage chamber 82 also extends in the direction of circumference about the axis S as the center, and is formed in a C shape with opposite ends being respectively movable ends 87. The deformation resistance in the vicinity of the movable ends 87 in the movable membrane 86 is smaller than at other parts. Therefore, when the movable membrane 86 receives a pressure wave with a change in liquid pressure in the main liquid chamber 52 upon input of vibration, the parts in the vicinity of the movable ends 87 of the movable membrane 86 start to move in the storage chamber 82 more preferentially than other parts, and come in contact with the tope plate part 66 or the bottom cover member 56 in advance of other parts.

Therefore, upon input of vibration, the movable membrane 86 comes in contact with the top plate part 66 or the bottom cover member 56 at the vicinities of a pair of the movable ends 87, and then increases in contact area. Therefore, as compared with the case where the entire movable membrane simultaneously comes in contact with the top plate part 66 or the bottom cover member 56, it is possible to effectively reduce the impact sound occurring when the movable membrane 86 comes in contact with the top plate part 66 or the bottom cover member 56.

Further, in the vibration isolation device 10, the bottom cover member 56 which the movable membrane 86 repeatedly comes in contact with or moves away from is formed of a material having elasticity or flexibility. In addition, the bottom surface side of the top plate part 66 in the orifice member 64 is covered with the rubber film 65 having elasticity. For this reason, the impact sound occurring when the movable membrane 86 comes in contact with the top plate part 66 or the bottom cover member 56 are also reduced by the buffer action against the impact which the movable membrane 86 and the rubber film 65 have.

Second Embodiment

Figure 5A:
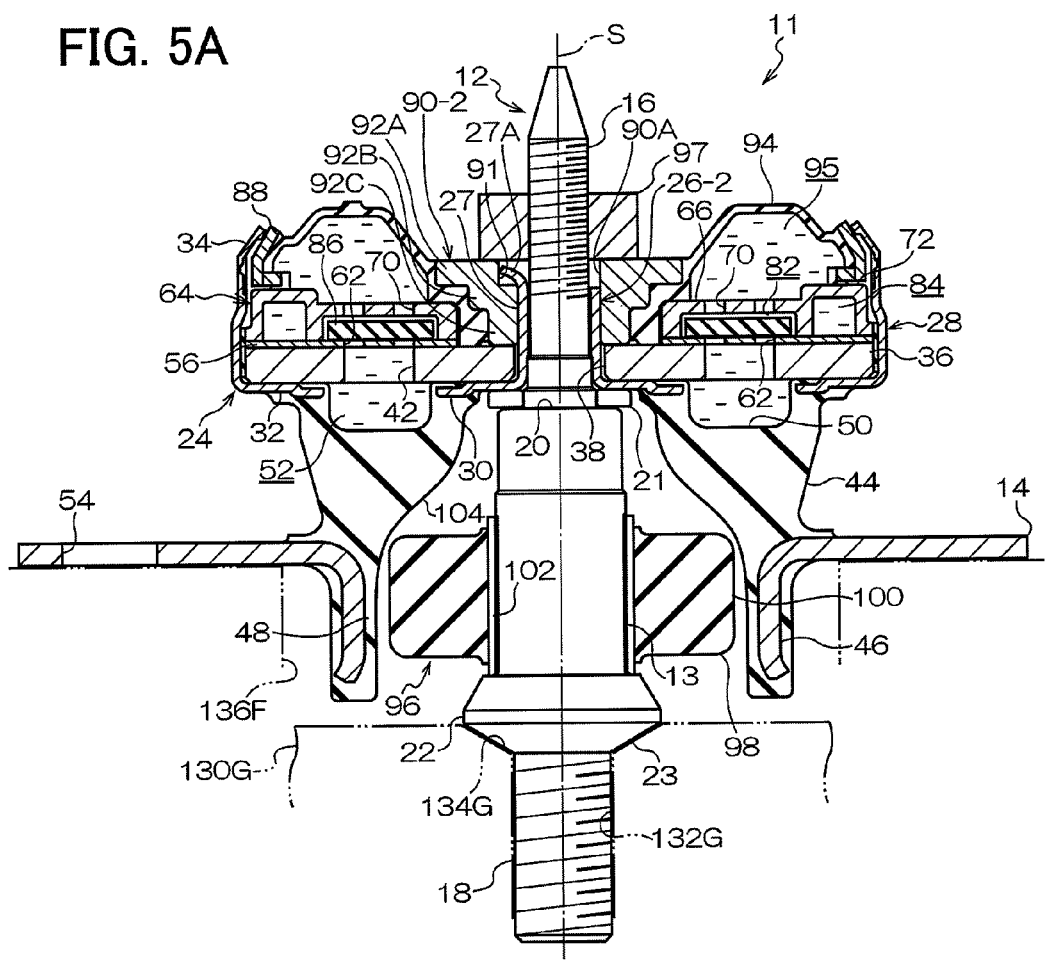
FIG. 5A A side cross sectional view showing a configuration of a vibration isolation device in accordance with a second embodiment.
Figure 5B:
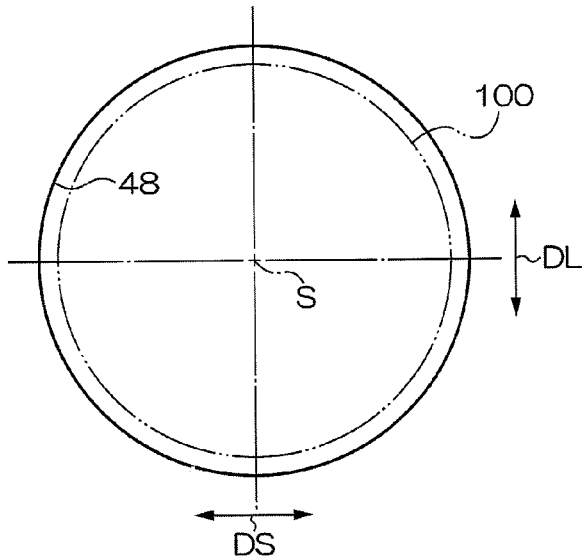
FIG. 5B A schematic top view showing a shape of a stopper surface of the vibration isolation device in accordance with the second embodiment.

FIG. 5A shows a vibration isolation device 11 in accordance with Second Embodiment of the invention. With the vibration isolation device 11 of this embodiment, the configurations of an inner tube metal part 26-2 and a connection ring 90-2 are different from those of the inner tube metal part 26 and the connection ring 90 of First Embodiment, and other configurations are the same. Therefore, only the inner tube metal part 26-2 and the connection ring 90-2, and the parts related to these will be described. Incidentally, with the vibration isolation device 11 in accordance with this embodiment, the same parts as those of the vibration isolation device 10 in accordance with First Embodiment are given the same reference numerals and signs, and a description thereon will be omitted.

As shown in FIG. 5A, a main body casing 24 formed in a substantially bottomed cylindrical shape is disposed on the outer circumferential side of the screw shaft 16. In the main body casing 24, the internal tube metal part 26-2 in a substantially cylindrical shape is disposed on the inner circumferential side, and on the outer circumferential side of the inner tube metal part 26-2, an outer tube metal part 28 in a substantially cylindrical shape is disposed.

Figure 6:
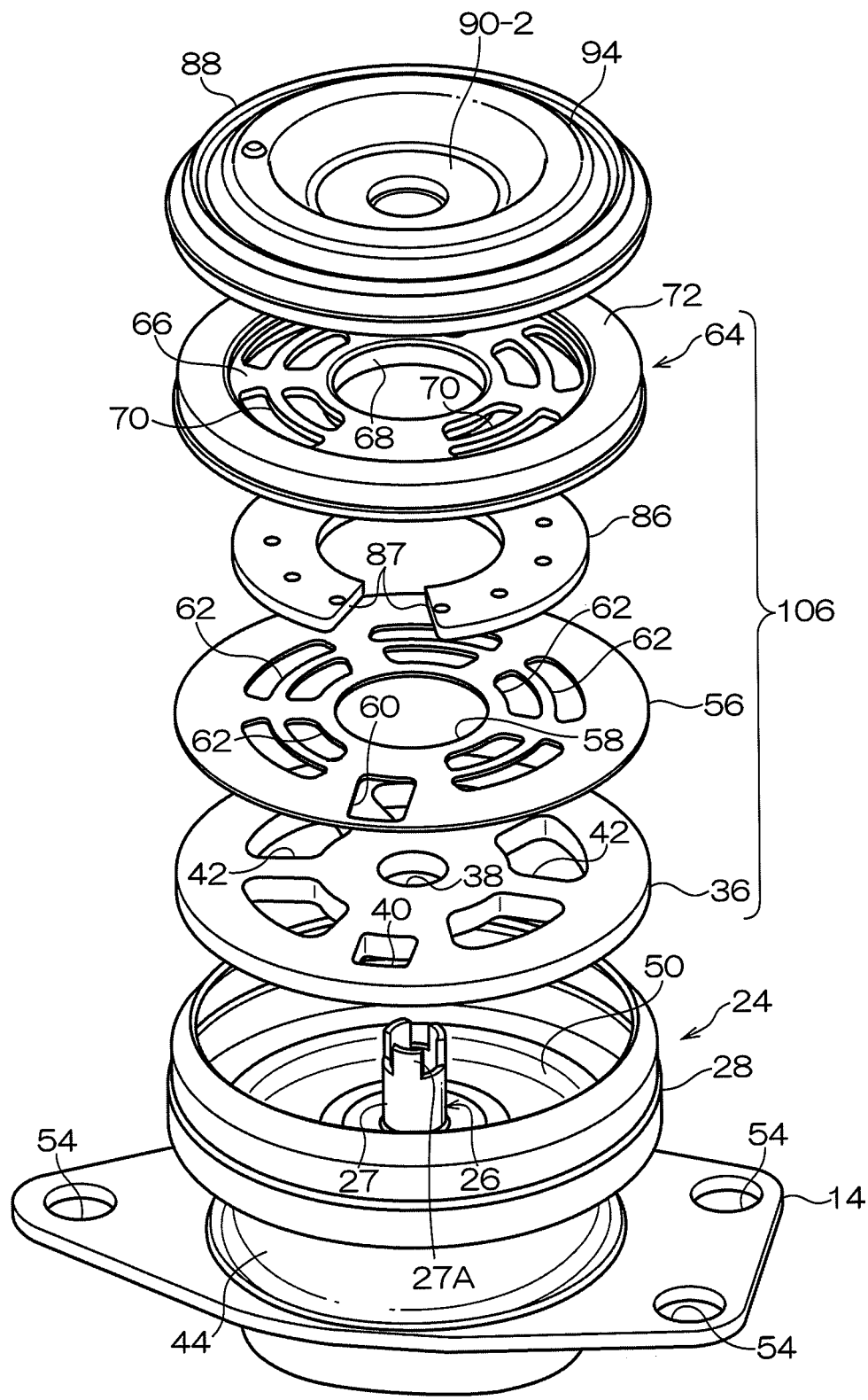
FIG. 6 An exploded perspective view of a main body casing and components to be placed in the main body casing in the vibration isolation device in accordance with the second embodiment.

As shown in FIG. 6, the inner tube metal part 26-2 has a cylindrical tube part 27, and an annular flange part 30 extending from the bottom end to the outside in the radial direction of the tube part 27. The top end side of the tube part 27 is cut away at three sites, and is formed of a protruding engagement swaging part 27A.

As shown in FIG. 1A, in the vibration isolation device 10, a diaphragm 94 is provided on the opposite side from the main liquid chamber 52 with the orifice member 64 interposed therebetween. The diaphragm 94 is in the shape of a ring, and formed in a thin film shape of, for example, a rubber material of NR/EPDM type excellent in ozone resistance. The outer circumferential part of the diaphragm 94 is vulcanization bonded on the inner circumferential side of the connection metal part 88 throughout the entire circumference thereof. Whereas, the inner circumferential part of the diaphragm 94 is vulcanization bonded on the outer circumferential side of the connection ring 90-2 throughout the entire circumference thereof.

The connection metal part 88 is in the shape of a ring, and fitted to the inner circumferential side of the outer tube metal part 28 and to the upper side of the orifice member 64. The connection metal part 88 is restricted on movement in the axial direction, and is fixed in the outer tube metal part 28 by the swaging part 34 by swaging of the swaging part 34 of the outer tube metal part 28 into a taper during assembly of the vibration isolation device 10.

The bottom cover member 56 and the orifice member 64 are interposed by the rubber elastic body 44, the connection metal part 88, and the connection ring 90-2 along the axial direction. Thus, they are restricted on movement in the axial direction, thereby to be fixed in the main body casing 24.

Figure 7:
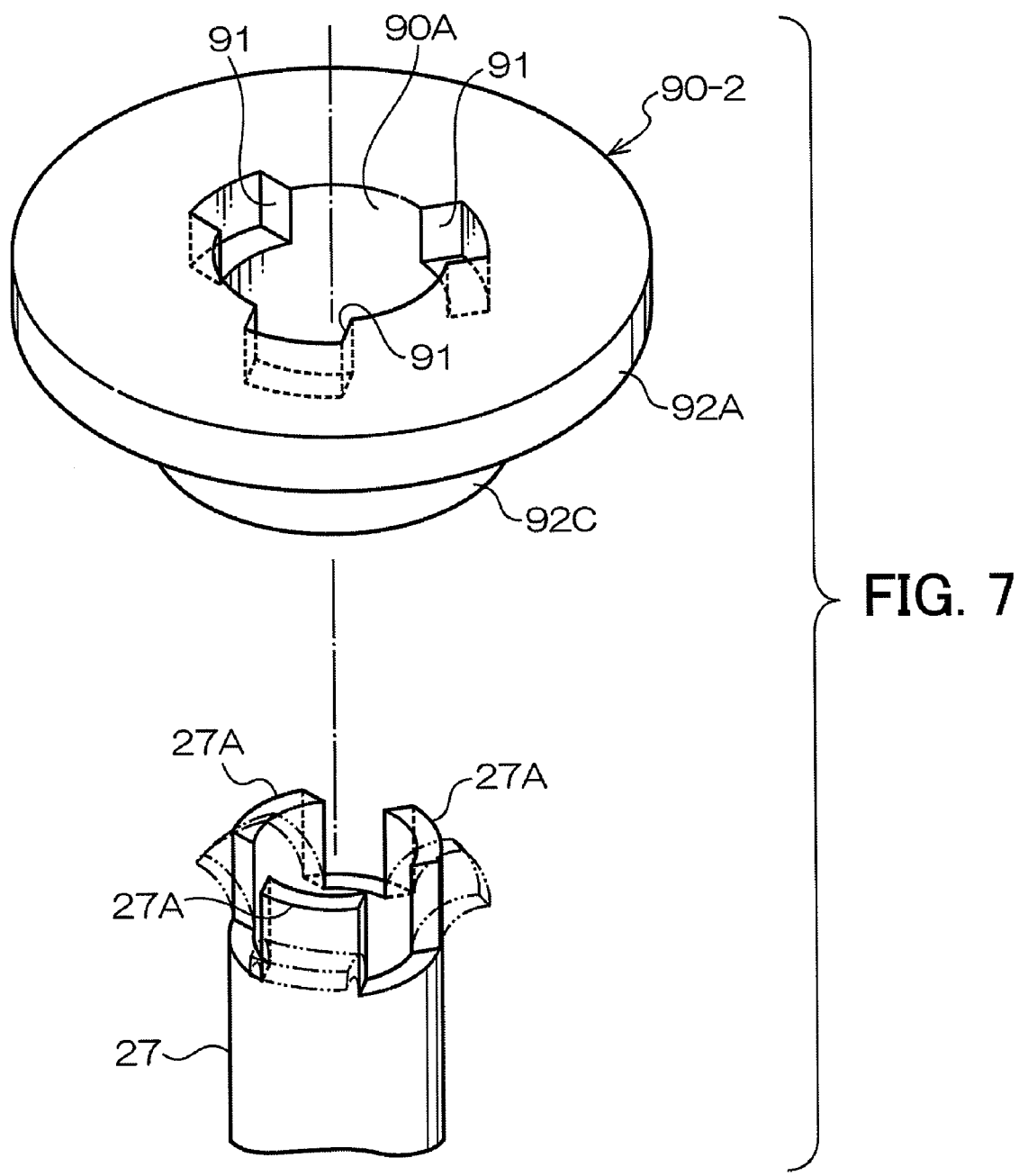
FIG. 7 An exploded perspective view showing a connection ring and a tube part of an inner tube metal part of the second embodiment.
Figure 8:
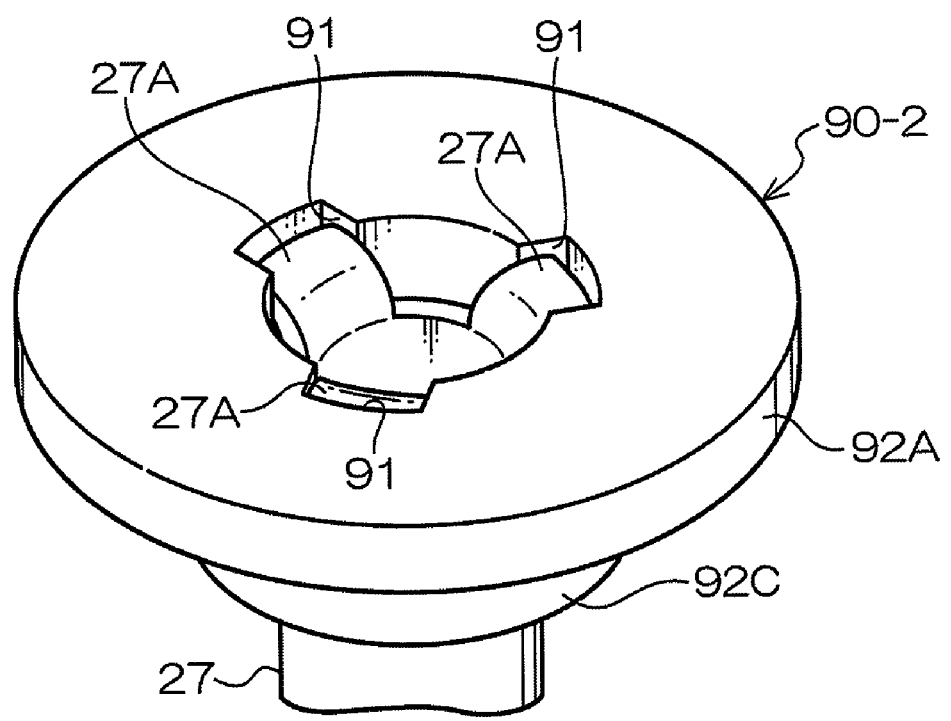
FIG. 8 A perspective view showing the connection ring and the tube part of the inner tube metal part of the second embodiment being swaged to each other.

The connection ring 90-2 is, as shown in FIG. 5A, in the shape of a lamination of three disks having different outer diameters, and includes a large diameter part 92A, an intermediate diameter part 92B, and a small diameter part 92C in order from the top. At the central part of the connection ring 90-2, an insertion hole 90A capable of allowing the tube part 27 of the internal tube metal part 26-2 to be inserted therethrough is formed. At the upper end of the inner circumferential wall forming the insertion hole 90A, as shown in FIG. 7, notch parts 91 formed by cutting away the inner circumferential wall outwardly in the radial direction are formed equidistantly at three sites. The connection ring 90-2 is fitted between the outer circumferential surface of the tube part 27 and the inner circumferential surface of the insertion part 68 of the orifice member 64. Thus, the distal end face of the small diameter part 92C is in contact with the top surface of the bottom plate 36. The connection ring 90-2 is fitted so as to be placed at the position at which the engagement swaging part 27A of the tube part 27 corresponds to the notch parts 91 upon assembly of the vibration isolation device 11. Then, the engagement swaging part 27A is swaged so as to open outwardly in the radial direction. As a result, as shown in FIG. 8, the engagement swaging part 27A is fitted to the notch parts 91. Thus, by engaging the engagement swaging part 27A to the notch parts 91, the inner tube metal part 26-2 and the connection ring 90-2 are prevented from relatively moving in the circumferential direction.

As shown in FIG. 5A, in the connection rod 12, onto the screw shaft 16, the fixing nut 97 is screwed. The fixing nut 97 is screwed in such a manner as to be pressed against the connection ring 90-2 with the upper end face of the connection ring 90-2 as the bearing surface. Thus, the fixing nut 97 interposes the inner tube metal part 26, the bottom plate 36, and the connection ring 90-2 between it and the spacer 21, and thereby fixes these to the connection rod 12.

As a result of this, the diaphragm 94 is fixed to the main body casing 24 by the connection metal part 88 and the connection ring 90-2, so that the top surface of the main body casing 24 is closed by the diaphragm 94. The diaphragm 94 is set in a state slackened so as to swell out along the axial direction between the connection metal part 88 and the connection ring 90-2. Thus, the diaphragm 94 is deformable in the axial direction by a relatively small load (liquid pressure).

In the case where the diaphragm 94 is fixed to the main body casing 24 in this manner, when the friction force between the fixing nut 97 and the connection ring 90 is large upon screwing of the fixing nut 97, these may rotate together. At this step, when the connection ring 90-2 and the inner tube metal part 26-2 relatively move, unfavorably, the diaphragm 94 can be twisted. Thus, in this embodiment, the relative movement between the connection ring 90-2 and the inner tube metal part 26-2 is prevented by engaging the engagement swaging part 27A to the notch parts 91. This can prevent twisting of the diaphragm 94.

Incidentally, in this embodiment, the relative movement in the direction of circumference of the inner tube metal part 26-2 and the connection ring 90-2 is prevented by engaging the engagement swaging part 27A to the notch parts 91, but can also be prevented by other configurations.

Figure 9:
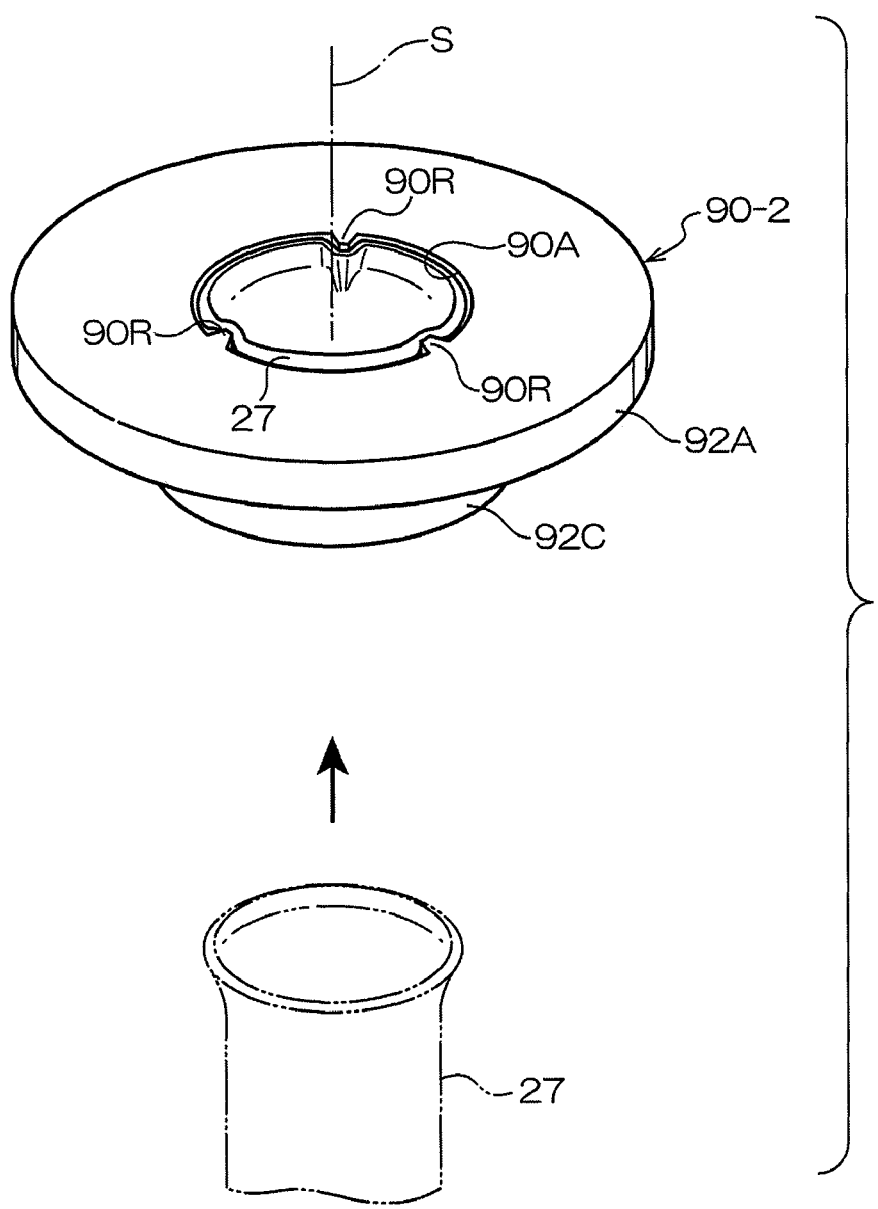
FIG. 9 A perspective view showing a connection ring and a tube part of an inner tube metal part of a modified example of the second embodiment being swaged to each other.

For example, as shown in FIG. 9, the tube part 27 of the inner tube metal part 26-2 is formed in a shape slightly expanding outwardly without forming a notch part at the tip part. In addition, ribs 90R are formed at the upper part of the inner wall of the insertion hole 90A of the connection ring 90-2. Then, the connection ring 90-2 is fitted to the outside of the tube part 27. Then, the tip of the tube part 27 is swaged along the inner circumference of the connection ring 90-2. As a result of this, the ribs 90R are engaged to the tip of the tube part 27 in such a manner as to be engaged into the tip of the tube part 27. This can prevent the relative movement to the direction of circumference of the internal metal part 26-2 and the connection ring 90-2.

Figure 10:
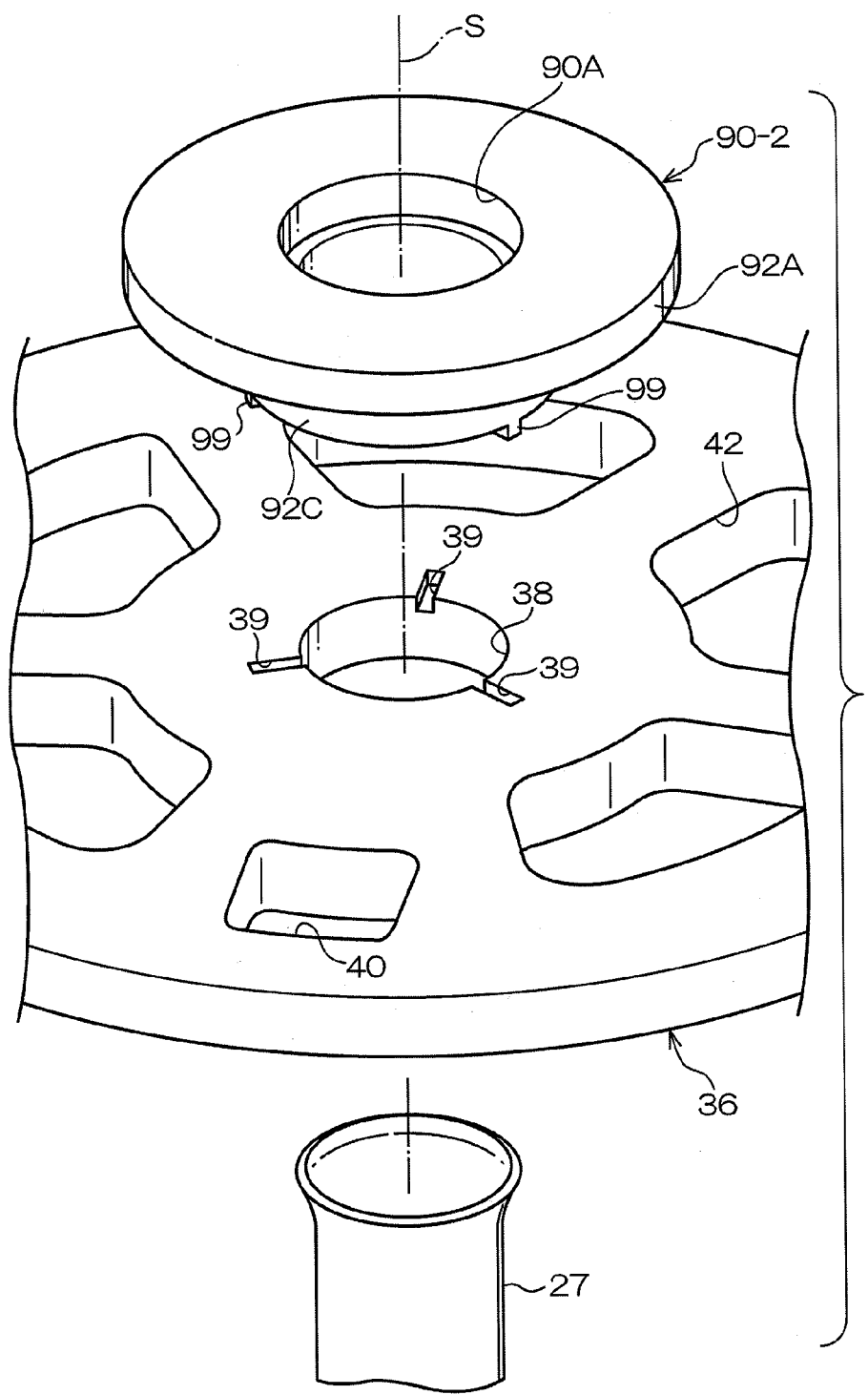
FIG. 10 An exploded perspective view showing a connection ring, a bottom plate, and a tube part of an inner tube metal part of a modified example of the second embodiment.

Further this embodiment, the bottom plate 36 is fixed in the main body casing 24. Accordingly, the relative movement to the direction of circumference of the internal metal part 26 and the connection ring 90-2 can also be implemented by preventing the relative movement of the connection ring 90-2 and the bottom plate 36. For example, as shown in FIG. 10, in the distal end face of the small diameter part 92C of the connection ring 90-2, a convex part 99 is formed. In addition, in the bottom plate 36, a concave part 39 capable of allowing the convex part 99 to be inserted therethrough is formed. Then, the convex part 99 is fitted into the concave part 39, which can prevent the relative movement in the direction of circumference of the connection ring 90-2.

Figure 11:
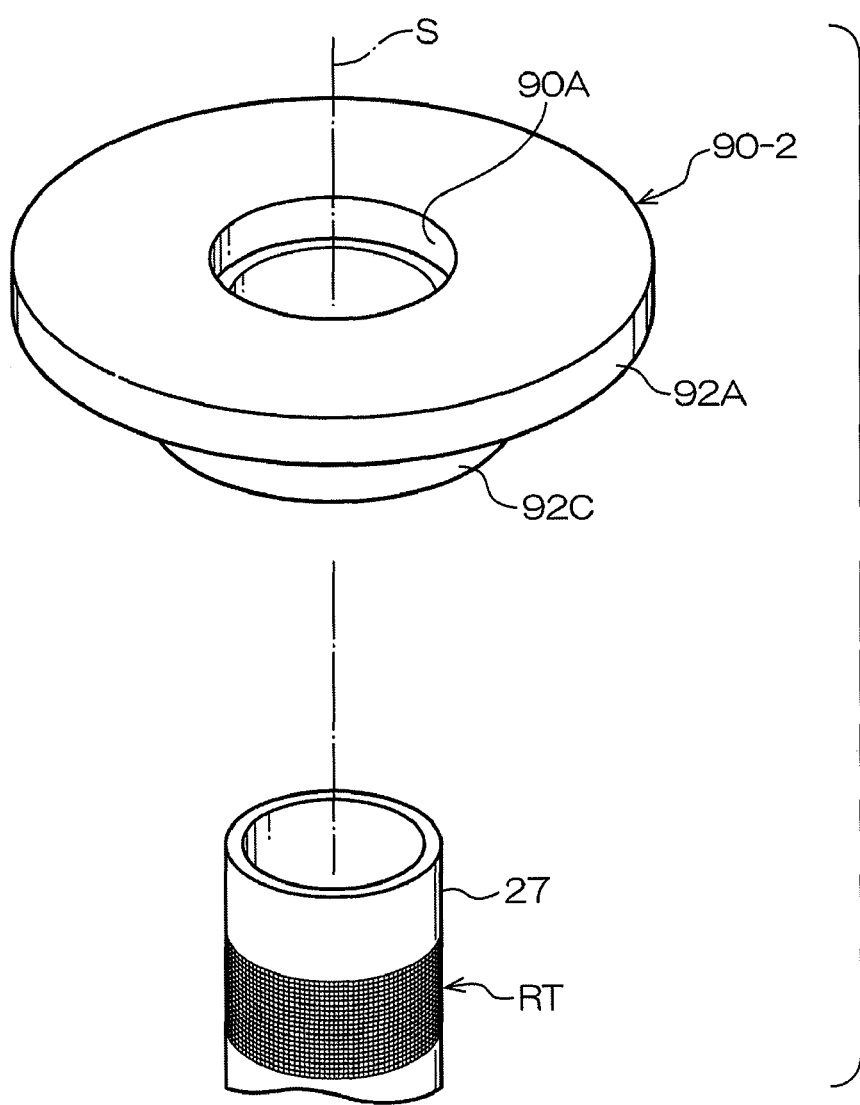
FIG. 11 An exploded perspective view showing a connection ring, and a tube part of an inner tube metal part of another modified example of the second embodiment.

Alternatively, the prevention of the relative movement to the direction of circumference of the inner tube metal part 26-2 and the connection ring 90-2 can also be implemented by increasing the friction force of the part at which the connection ring 90-2 and the inner tube metal part 26 are in contact with each other. In order to increase the friction force, for example, as shown in FIG. 11, there are conceivable the methods of applying knurling RT to the outer circumferential surface of the tube part 27 or forming unevenness on the inner wall of the insertion hole 90A of the connection ring 90-2, and other methods.

Figure 12:
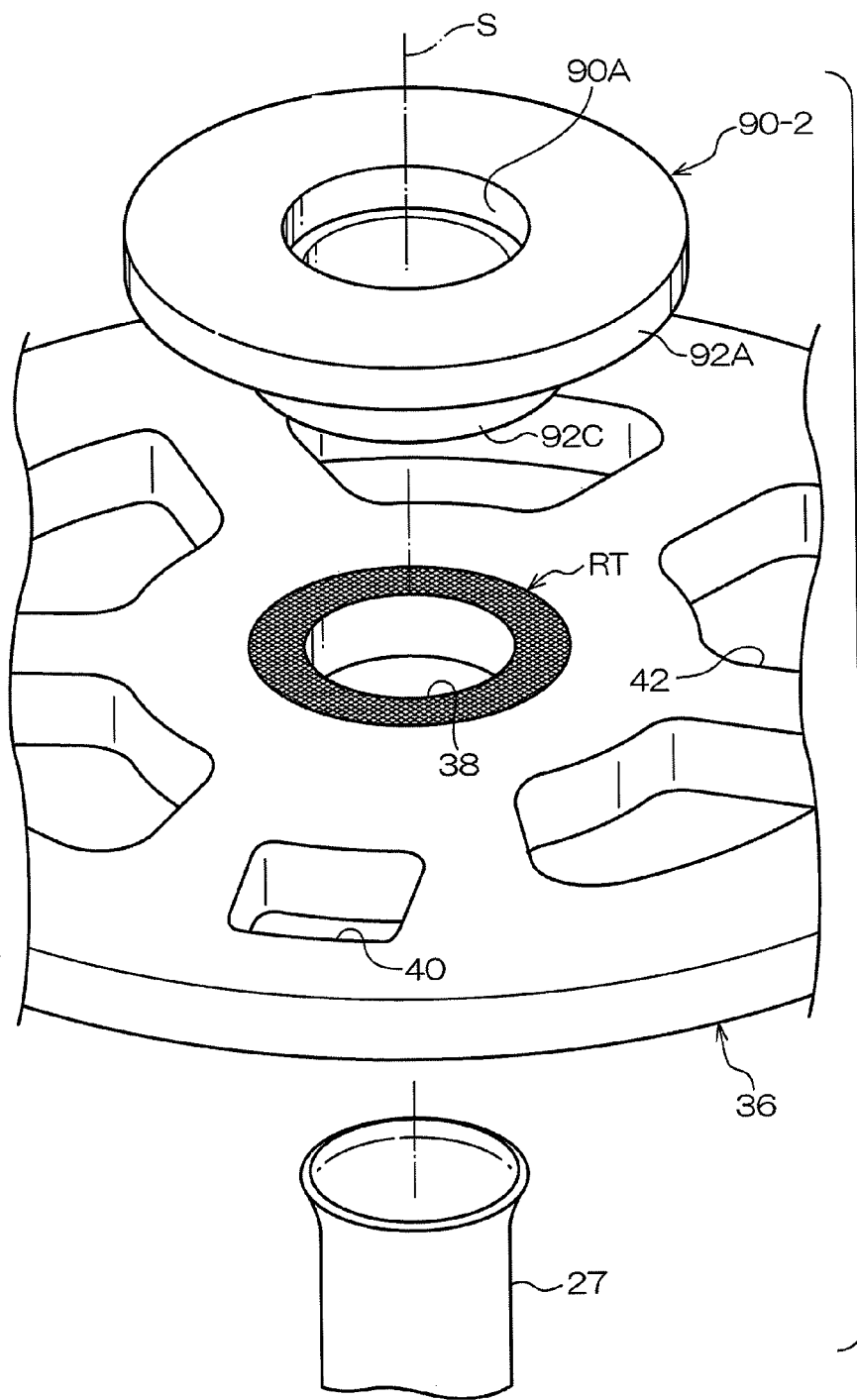
FIG. 12 An exploded perspective view showing a connection ring, a bottom plate, and a tube part of an inner tube metal part of a still other modified example of the second embodiment.

Further, in this embodiment, the bottom plate 36 is fixed in the main body casing 24. Accordingly, the prevention of the relative movement to the direction of circumference of the inner tube metal part 26-2 and the connection ring 90-2 can also be implemented by increasing the friction force of the part at which the connection ring 90-2 and the bottom plate 36 are in contact with each other. In order to increase the friction force, for examples, as shown in FIG. 12, there are conceivable the methods of applying knurling RT to the top surface of the bottom plate 36 or the distal end face of the small diameter part 92C of the connection ring 90 or forming unevenness thereon, and other methods.

Third Embodiment

Figure 13:
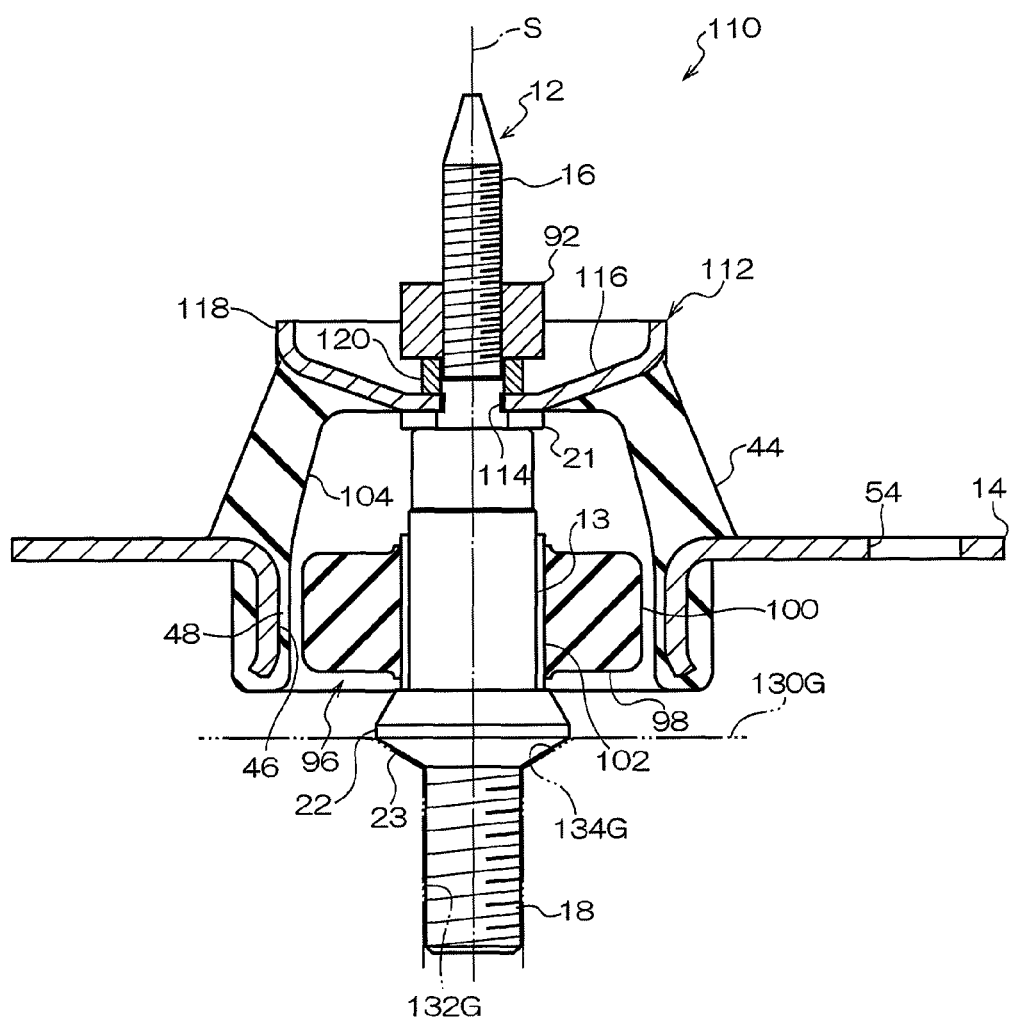
FIG. 13 A side cross sectional view showing a configuration of a vibration isolation device in accordance with a third embodiment.

FIG. 13 shows a vibration isolation device in accordance with Third Embodiment of the invention. The vibration isolation device 110 is to be applied as a mount device for supporting the power unit including an engine and a gear box which are the vibration generation parts in a vehicle such as a car to the car body which is the vibration receptive part. Incidentally, with the vibration isolation device 110 in accordance with this embodiment, the same parts as those of the vibration isolation device 10 in accordance with First Embodiment are given the same reference numerals and signs, and a description thereon will be omitted.

The vibration isolation device 110 in accordance with this embodiment is different from the vibration isolation device 10 in accordance with First Embodiment in not including the main liquid chamber 52, the sub liquid chamber 95, and the orifice passage 84. As shown in FIG. 13, in the vibration isolation device 110, a main body casing 112 in a substantially plate form is placed on the outer circumferential side of the screw shaft 16 of the connection rod 12. In the main body casing 112, a circular insertion hole 114 is bored at the central part thereof. In the insertion hole 114, the screw shaft 16 is inserted. Further, in the main body casing 24, an upwardly inclined taper part 116 is formed on the outer circumferential side of the insertion hole 114. In addition, a bent part 118 upwardly bent is formed in a ring on the outer circumferential end.

With the vibration isolation device 110, a thick wall cylindrical spacer 120 is fitted on the outer circumferential side of the screw shaft 16. In addition, the fixing nut 92 is screwed thereto, so that the main body casing 112 is fixed to the connection rod 12. Further, with the vibration isolation device 110, a rubber elastic body 44 is placed between the main body casing 112 and the main body plate 14. The rubber elastic body 44 is vulcanization bonded to the bottom surface side of the taper part 116 in the main body casing 112 at the upper end thereof, and is vulcanization bonded to the top surface side of the main body plate 14 at the lower end thereof.

Then, a description will be given to the operation and the advantage of the vibration isolation device 110 in accordance with Third Embodiment of the invention, configured in the foregoing manner.

With the vibration isolation device 110, upon input of vibration from the gear box 130G side, the rubber elastic body 44 which is the vibration absorption main body is elastically deformed due to the vibration. As a result of this, the input vibration is attenuated and absorbed by the rubber elastic body 44. At this step, even when the input vibration is any of a longitudinal vibration oscillating along the axial direction, or a transverse vibration oscillating along the direction orthogonal to the axis, the input vibration is attenuated and absorbed by elastic deformation of the rubber elastic body 44 upon input of vibration.

Further, also in the vibration isolation device 110 in accordance with this embodiment, when the input load is small, and the displacement amount along the direction orthogonal to axis of the connection rod 12 is smaller than the gap between the outer circumferential surface of the stopper rubber 98 and the inner circumferential surface of the cover part 48, displacement along the direction orthogonal to axis of the connection member is not restricted by the stopper receptive part 46. Thus, the displacement (vibration) along the direction orthogonal to axis of the connection rod 12 occurring with load input is gradually attenuated and absorbed by the elastic deformation of the rubber elastic body 44.

Further, when the input load is large, and larger displacement than the gap between the outer circumferential surface of the stopper rubber 98 and the inner circumferential surface of the cover part 48 occurs in the connection rod 12, the stopper rubber 98 is pressed against the cover part 48, and the stopper rubber 98 and the cover part 48 undergo elastic deformation (compression deformation). The displacement along the direction orthogonal to axis of the connection rod 12 is restricted by the elastic deformation resistance of the stopper rubber 98 and the cover part 48. In addition, transfer of vibration between the connection rod 12 and the main body plate 14 is suppressed by the stopper rubber 98 and the cover part 48.

Further, also in the vibration isolation device 110, the connection rod 12 penetrates through the cavity part 104 of the rubber elastic body 44 and the inner circumferential side of the main body plate 14. In addition, the stopper rubber 98 fixed on the outer circumferential side of the rod main body 13 of the connection rod 12 is placed in the cavity part 104 of the rubber elastic body 44. This allows the rod main body 13 aligned in overlying relation with the rubber elastic body 44 along the axial direction of the connection rod 12 to be stored in the device. Thus, the stopper member 96 fixed to the rod main body 13 of the connection rod 12 can form the stopper mechanism. Therefore, the dimension along the axial direction of the connection rod 12 can be elongated while suppressing the increase in dimension along the axial direction of the device. In addition, the dimension along the axial direction of the device can be prevented from expanding by the stopper mechanism for preventing the excessive displacement along the direction orthogonal to axis of the connection rod 12.

The invention claimed is:
1. A vibration isolation device comprising:
a first main body member formed in a ring shape, and to be connected to a vibration receptive part;
a rod-like connection member penetrating through the inner circumferential side of the first main body mem- ber, and to be connected to a vibration generation part at the proximal end side protruding outwardly from the first main body member;
a second main body member connected and fixed to the distal end protruding outwardly from the first main body member in the connection member; and
a substantially tubular elastic body placed on the outer circumferential side of the connection member and between the first main body member and the second main body member, and elastically connecting the first main body member and the second main body member,
wherein a cavity part through which the connection member penetrates is formed at the central part of the elastic body, and
a stopper rubber is located in the cavity part, and the stopper rubber is fixed to the outer circumferential side of the connection member, such that the outer circumferential surface of the stopper rubber faces the inner circumferential surface of the first main body member with a prescribed gap interposed therebetween.

2. The vibration isolation device according to claim 1, comprising:
a main liquid chamber including the elastic body as at least a part of a division wall, and containing a liquid sealed therein;
a sub liquid chamber provided in such a manner as to face the main liquid chamber and as to be along the axial direction of the connection member, and containing a liquid sealed therein;
a diaphragm member forming a part of the division wall of the sub liquid chamber, and configured to be deformable in the expansion and contraction direction of expanding and contracting of the internal volume of the sub liquid chamber;
a screen member placed between the main liquid chamber and the sub liquid chamber along the axial direction, and forming respective parts of the inner wall surfaces of the main liquid chamber and the sub liquid chamber; and
a restriction passage for establishing mutual communication between the main liquid chamber and the sub liquid chamber.

3. The vibration isolation device according to claim 2, wherein the diaphragm member includes a diaphragm main body configured to be deformable in the expansion and contraction direction, and the diaphragm main body is formed as a separate body from the elastic body.

4. The vibration isolation device according to claim 3, wherein:
the second main body member includes an inner tube part formed in a substantially cylindrical shape, and through which the distal end side of the connection member is inserted, and an outer tube part formed in a substantially cylindrical shape, and placed on the outer circumferential side of the inner tube part, and
the diaphragm member includes an inner circumference support metal part attached to the inner circumferential part of the diaphragm main body throughout the entire circumference thereof, and fitted by insertion and fixed to the outer circumferential side of the inner tube part, and an outer circumference support metal part attached to the outer circumferential part of the diaphragm main body throughout the entire circumference thereof, and fitted by insertion and fixed to the inner circumferential side of the outer tube part.

5. The vibration isolation device according to claim 4, further comprising:
a fixing nut screwed from the distal end side of the connection member, and for fixing the inner circumference support metal part to the connection member while pressing the inner circumference support metal part; and
a relative movement prevention member for preventing relative movement in the circumferential direction of the second main body member and the inner circumference support metal part.

6. The vibration isolation device according to claim 5, wherein the relative movement prevention member is configured such that at least one of the inner circumferential surface of the inner circumference support metal part or the outer circumferential surface of the inner tube part includes a high friction surface having a higher friction coefficient than that of a smooth surface.

7. The vibration isolation device according to claim 5, wherein the relative movement prevention member comprises a notch part formed by cutting away the inner circumferential surface of the inner circumference support metal part outwardly in the radial direction, and an engagement convex part protruding outwardly in the radial direction at the outer circumferential surface of the inner tube part and engaged with the notch part.

8. The vibration isolation device according to claim 5, wherein the relative movement prevention member comprises a convex part protruding inwardly from the inner circumferential surface of the inner circumference support metal part, and an engagement swaging part formed by deforming the fixing nut side end of the inner tube part along the convex part.

9. The vibration isolation device according to claim 4, wherein the outer tube part includes a swaging part which has undergone plastic deformation toward the inner circumference side thereof after fitting by insertion of the outer circumference support metal part to the inner circumferential side of the swaging part, and restricts movement along the axial direction of the outer circumference support metal part.

10. The vibration isolation device according to claim 3, wherein the elastic body and the diaphragm main body are respectively formed of different types of rubber materials.

11. The vibration isolation device according to claim 2, wherein the elastic body, the main liquid chamber, the sub liquid chamber, and the screen member are respectively formed in a ring shape, and are placed on the outer circumferential side of the connection member so as to surround the connection member, and the sub liquid chamber is provided so as to face the main liquid chamber along the axial direction of the connection member.

12. The vibration isolation device according to claim 11, further comprising:
a hollow storage chamber provided inside the screen member;
a first opening for establishing communication between the storage chamber and the main liquid chamber;
a second opening for establishing communication between the storage chamber and the sub liquid chamber; and
a circulation control plate placed in the storage chamber, and upon input of vibration to the connection member or the first main body member, coming in contact with and moving away from the peripheral part of the first opening and the peripheral part of the second opening in the inner wall surface of the storage chamber in synchronism with the input vibration, and alternately opening and closing the first opening and the second opening, to thereby control liquid circulation between the main liquid chamber and the sub liquid chamber through the storage chamber.

13. The vibration isolation device according to claim 12, wherein
the storage chamber is formed so as to extend along the direction of circumference about the connection member as the center, and
the circulation control plate extends along the direction of circumference about the vicinity of the connection member as the center, and is formed in a substantially C shape with both ends thereof being movable ends.

14. The vibration isolation device according to claim 12, wherein at least the peripheral part of the first opening and the peripheral part of the second opening in the inner wall surface of the storage chamber are formed of an elastic material.

15. The vibration isolation device according to claim 11, wherein the restriction passage is provided in the screen member.

16. The vibration isolation device according to claim 1, further comprising an elastic cover part integrally formed with the elastic body, wherein the elastic cover part covers the region facing at least the stopper rubber at the inner circumferential surface of the first main body member.

17. The vibration isolation device according to claim 1, wherein a cross sectional shape of at least one of the inner circumferential surface of the first main body member or the outer circumferential surface of the stopper rubber is a non-circular shape.

18. The vibration isolation device according to claim 1, wherein the elastic body and the stopper rubber are respectively formed of rubber materials having different characteristics with respect to input vibration.

19. The vibration isolation device according to claim 1, wherein the screen member is fixed inside the second main body member, and the inner circumference support metal part is in contact with the screen member, and
the relative movement prevention member is configured such that at least one of the contact surface of the inner circumference support metal part with the screen member or the contact surface of the screen member with the inner circumference support metal part includes a high friction surface having a higher friction coefficient than that of a smooth surface.

20. The vibration isolation device according to claim 1, wherein the screen member is fixed inside the second main body member, and the inner circumference support metal part is in contact with the screen member, and
the relative movement prevention member comprises a convex part to be engaged in a concave part formed in one of the inner circumference support metal part or the screen member and a concave part formed in the other in the contact part between the inner circumference support metal part and the screen member.

* * * * *